US011202238B2

(12) United States Patent
Khalid

(10) Patent No.: US 11,202,238 B2
(45) Date of Patent: Dec. 14, 2021

(54) METHODS AND APPARATUS FOR SUPPORTING UE HANDOVER USING A NARROW BAND-INTERNET OF THINGS (NB-IOT)

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 145 days.

(21) Appl. No.: 16/729,238

(22) Filed: Dec. 27, 2019

(65) Prior Publication Data

US 2021/0204183 A1   Jul. 1, 2021

(51) Int. Cl.
*H04W 36/08* (2009.01)
*H04W 36/00* (2009.01)

(52) U.S. Cl.
CPC ....... *H04W 36/08* (2013.01); *H04W 36/0022* (2013.01); *H04W 36/0033* (2013.01); *H04W 36/0055* (2013.01)

(58) Field of Classification Search
CPC . H04W 36/0033; H04W 36/08; H04W 36/36; H04W 36/0061; H04W 36/0083; H04W 36/0069; H04W 36/0007; H04W 36/0072; H04W 36/0022; H04W 36/0055; H04W 36/00837
See application file for complete search history.

(56) References Cited

U.S. PATENT DOCUMENTS

| | | | | |
|---|---|---|---|---|
| 11,051,184 B1* | 6/2021 | Ami | | H04W 24/02 |
| 2018/0063763 A1* | 3/2018 | Gupta | | H04W 16/08 |
| 2019/0150134 A1* | 5/2019 | Kakinada | | H04L 67/125 |
| | | | | 370/330 |
| 2019/0253836 A1* | 8/2019 | Sinha | | H04W 4/023 |
| 2020/0252809 A1* | 8/2020 | Patil | | H04W 52/36 |
| 2020/0288387 A1* | 9/2020 | Siddalinga | | H04W 88/06 |
| 2021/0119750 A1* | 4/2021 | Hong | | H04L 12/2823 |
| 2021/0176686 A1* | 6/2021 | Khalid | | H04W 28/08 |

\* cited by examiner

*Primary Examiner* — Allahyar Kasraian
(74) *Attorney, Agent, or Firm* — Straub & Straub; Michael P. Straub; Stephen T. Straub

(57) ABSTRACT

A connection including a wireless NB-IoT link is established between a base station in a MNO network and a base station in a MSO network. UE context information, UE radio frequency (RF) information and/or UE Key Performance Indicator (KPI) information are exchanged between the two networks over the established connection via the NB-IoT link, thus facilitating handover preparation and/or handover for a UE. A control server in the MNO controls transfer over the connection including the NB-IoT link, receives and sends information and requests over the connection, evaluates received UE information, makes handover decisions, and generates and sends handover requests.

20 Claims, 20 Drawing Sheets

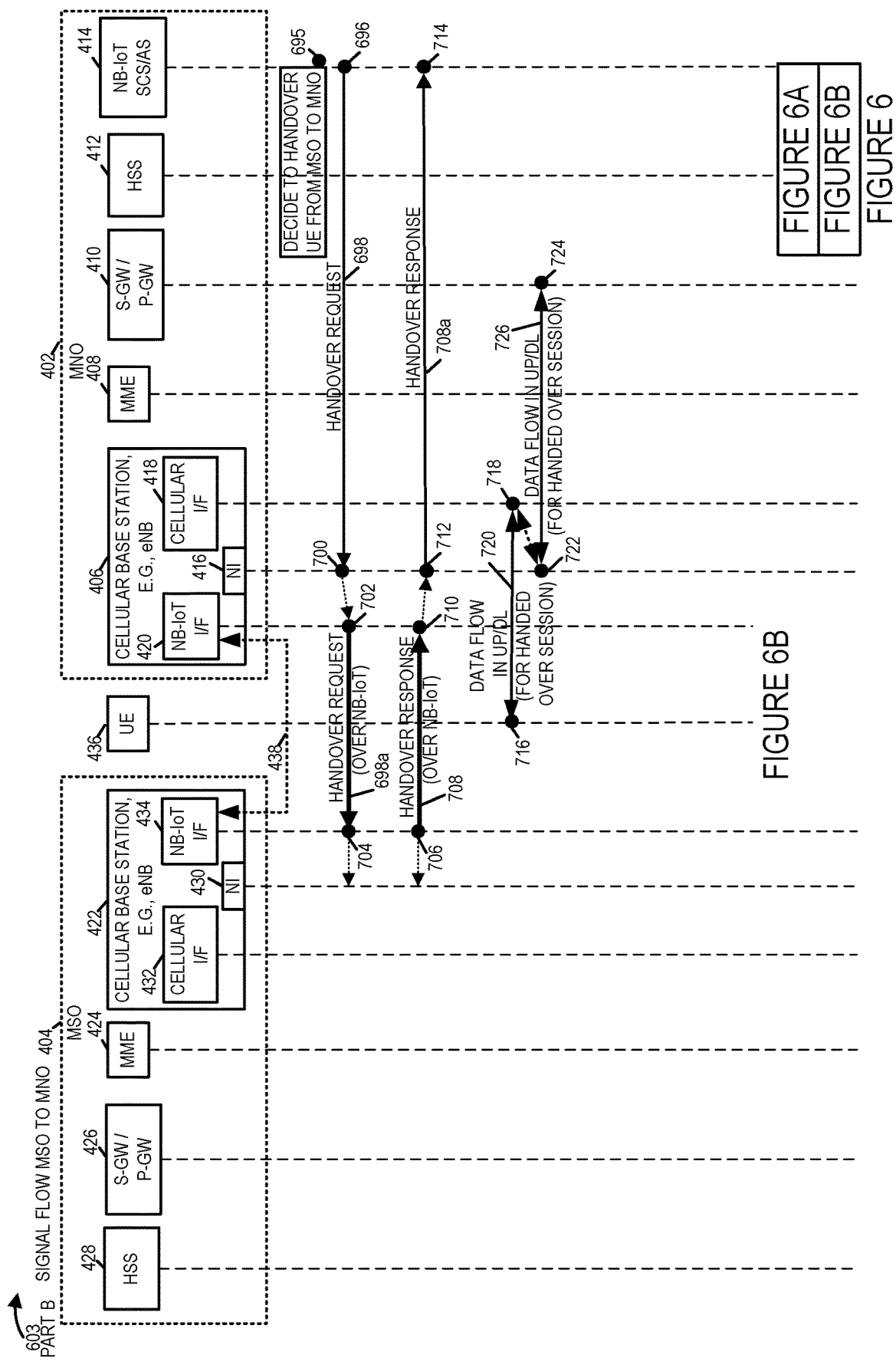

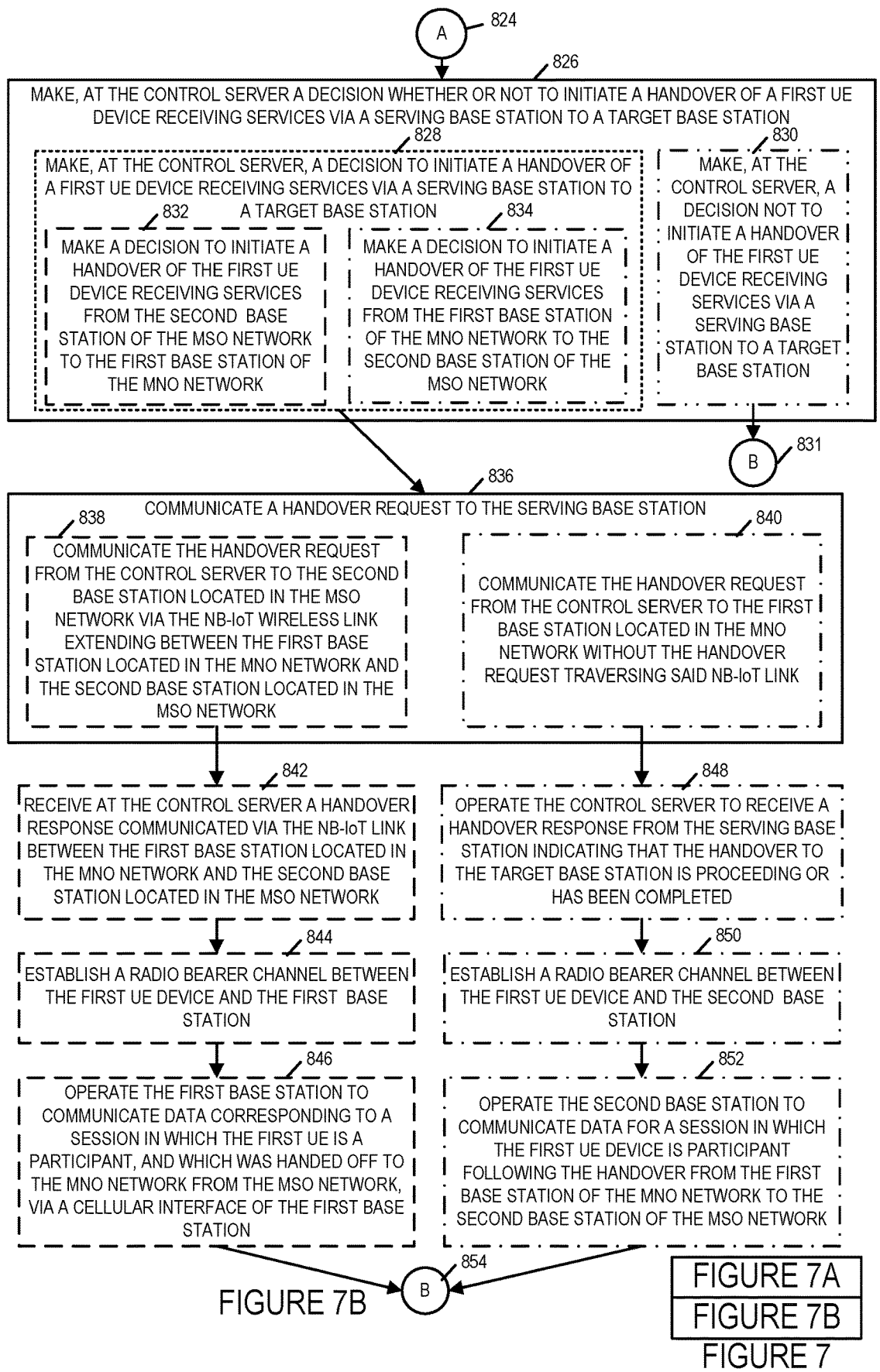

METHODS AND APPARATUS FOR SUPPORTING UE HANDOVER USING A NARROW BAND-INTERNET OF THINGS (NB-IOT)

FIELD

The present application relates to communications methods and apparatus, and more particularly, to methods and apparatus for supporting handover between multiple system operator (MSO) networks and mobile network operator (MNO) networks, e.g., using a Narrow Band-Internet of Things (NB-IoT) communications link between a cellular base station of the MSO network and a cellular base station of the MNO network.

BACKGROUND

User equipment (UE) devices may, and sometimes do, subscribe to a plurality of networks including, e.g., a mobile network operator LTE network and a multiple system operator (MSO) network including a MSO LTE network The MNO network and the MSO network may, and sometimes do, have overlapping coverage areas. Thus a UE device may have the opportunity to receive service from an MSO network or an MNO network based on the subscription to multiple networks. A UE may move from the MNO LTE network into the MSO's LTE network and vice-versa. Thus a UE, which is subscribed to both the networks, may roam in and out of MNO coverage and may roam in and out of the MSO coverage. Typically both systems operate independently resulting in the MSO network has no priori knowledge of the UE moving back into its the MSO network coverage area, and the MNO network has no priori knowledge of the UE moving back into its MNO coverage area in typical systems.

Operation could be more efficient, especially with regard to handover, if each of the two networks was made aware of the UE while the UE operating in the other's network. One approach is to attempt to attempt to facilitate efficient handover between the two networks is use a connection manager on the UE which measures and helps the Evolved Packet Cores (EPCs) of the two networks to make the decision of handover between the two networks. However, this approach does not facilitate a highly efficient transfer from one network to another and may result in re-download of data, e.g., at the MSO end, a delayed or dropped call, and in some cases ping-pong between the MNO and the MSO network. In addition continuous scanning by the UE of the two networks may cause UE battery drain. Another approach to facilitate efficient handover between the two networks is to create an MME/HSS instance of MNO in the MSO's network. However, this approach is expensive and MNO's are often not open to sharing the details of their network with MNOs.

Based on the above, there is a need for new methods and apparatus for supporting efficient handovers of UEs between MNO networks and MSO networks.

SUMMARY

Methods and apparatus for facilitating efficient handover of UEs between MNO networks and MSO networks are described. A base station, e.g., an LTE cellular base station, of a MNO network is connected over the air to a base station, e.g. an LTE cellular base station, of a MSO network via a Narrow Band-Internet of Things (NB-IoT) link. The details of a UE can be, and sometimes are, shared in a UE context message communicated from one network to the other via the NB-IoT link. Exemplary UE context information communicated between the networks via the NB-IoT link includes, e.g. control/user plane bearers, security profile information, QoS and/or other parameters which are beneficial for a smooth handover and/or other reasons.

In various exemplary embodiments, the exchange of context is processed locally and registered back to the core network to establish a new connection. This approach can result in a smoother and/or more efficient handover from MNO to MSO, as a MSO, which is expecting a UE, operating in a nearby or overlapping MNO network, to join the MSO network has been provisioned with context information prior to or as part of handover. This priori knowledge of an incoming UE to the MSO network will also help the MSO get ready and shuffle its resources if necessary. Similarly this approach will result in a smoother and/or more efficient handover from MSO to MNO, as the MNO, which is expecting a UE, operating in a nearby or overlapping MSO network, to join the MNO network has been provisioned with context information prior to or as part of the handover. This priori knowledge of an incoming UE to the MNO network will also help the MNO get ready and shuffle its resources if necessary.

In some embodiments, the MNO network includes a control server, e.g., an Service Capabilities Server/Application Server (SCS/AS), which establishes a communications connection between the MNO network and the MSO network, said communication connection including a NB-IoT wireless link between a base station in the MNO and a base station in the MSO, facilitates communication of UE context information, UE RF information, and/or UE Key Performance Indicator (KPI) information between the two networks, makes handover decisions, and/or sends handover messages.

An exemplary communications method, in accordance with some embodiments, comprises: establishing a communications path between a control server in a mobile network operator (MNO) network and a network interface of a multiple system operator (MSO) network via a Narrow Band-Internet of Things (NB-IoT) wireless link extending between a first base station located in the MNO network and a second base station located in the MSO network; making, at the control server a decision to initiate a handover of a first UE device receiving services via a serving base station to a target base station; and communicating a handover request to the serving base station.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 6B is a second part of a drawing illustrating elements of exemplary system of FIG. 4 and exemplary steps and signaling flows for an example including a handover of a UE from a cellular base station of a MSO network to a cellular base station of a MNO network in accordance with an exemplary embodiment, wherein some of the signaling related to handover decisions, handover preparation and/or handover operations is communicated via a NB-IoT wireless communications link between a base station, e.g., an eNodeB, in MSO network and an base station, e.g. an eNode B, in the MNO network.

FIG. 6 comprises the combination of FIG. 6A and FIG. 6B.

FIG. 7B is a second part of a flowchart of an exemplary communications method in accordance with an exemplary embodiment.

FIG. 7 comprises the combination of FIG. 7A and FIG. 7B.

DETAILED DESCRIPTION

Figure 1:
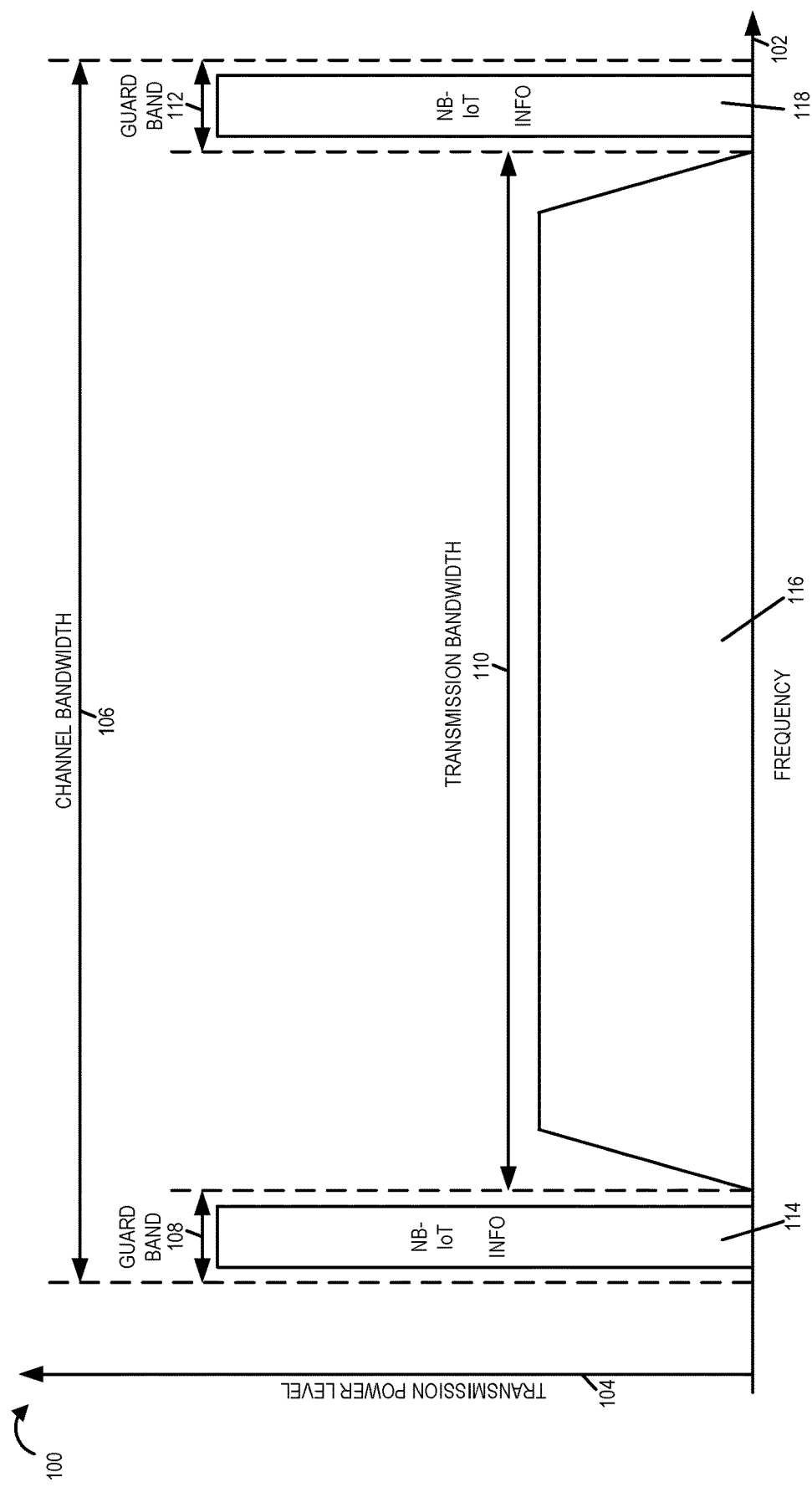
FIG. 1 illustrates an exemplary NB-IoT implementation in guard bands, e.g., of a Citizens Broadband radio Services Device (CBSD) Priority Access License (PAL), in which information related to handover of a UE from a cellular base station of a multiple system operator (MSO) network to a cellular base stations of a mobile network operator (MNO) network and/or information related to handover of a UE from a cellular base station of the MNO network to a cellular base station of the MSO network, may be, and sometimes is, communicated in the guard bands using NB-IoT signaling, in accordance with an exemplary embodiment.

FIG. 1 is a drawing 100 illustrating an exemplary NB-IoT implementation in guard bands, e.g., of a Citizens Broadband radio Services Device (CBSD) Priority Access License (PAL), in which information related to handover of a UE from a cellular base station of a multiple system operator (MSO) network to a cellular base stations of a mobile network operator (MNO) network and/or information related to handover of a UE from a cellular base station of the MNO network to a cellular base station of the MSO network, may be, and sometimes is, communicated in the guard bands using NB-IoT signaling, in accordance with an exemplary embodiment. Drawing 100 of FIG. 1 includes horizontal axis 102 representing frequency and vertical axis 104 representing transmission power level. Exemplary channel bandwidth 106 includes guard band 108 transmission bandwidth 110 and guard band 112. Traditional network signaling, e.g., cellular network signals, including, e.g., CBRS signals, are conveyed via resource 116 corresponding to transmission bandwidth 110.

NB-IoT is a Frequency Division Duplex (FDD) based technology and will not work with CBRS (A Time Division Duplex (TDD) Technology) using the typical transmission bandwidth 110. In order to make NB-IoT work with TDD, two separate frequency bands are needed, this isolation is provided by two guard bands (108, 112) at the opposite ends of the channel bandwidth spectrum 106. NB-IoT signaling, e.g., conveying: requests for UE context, requests for UE RF information and Key Performance Indicators (KPIs), reports communicating reports communicating UE context, reports communicating UE context and KPIs, reports communicating measurements information, handover requests and handover responses, is conveyed via resource 114 corresponding to guard band 108 and resource 118 corresponding to guard band 112.

Figure 2:
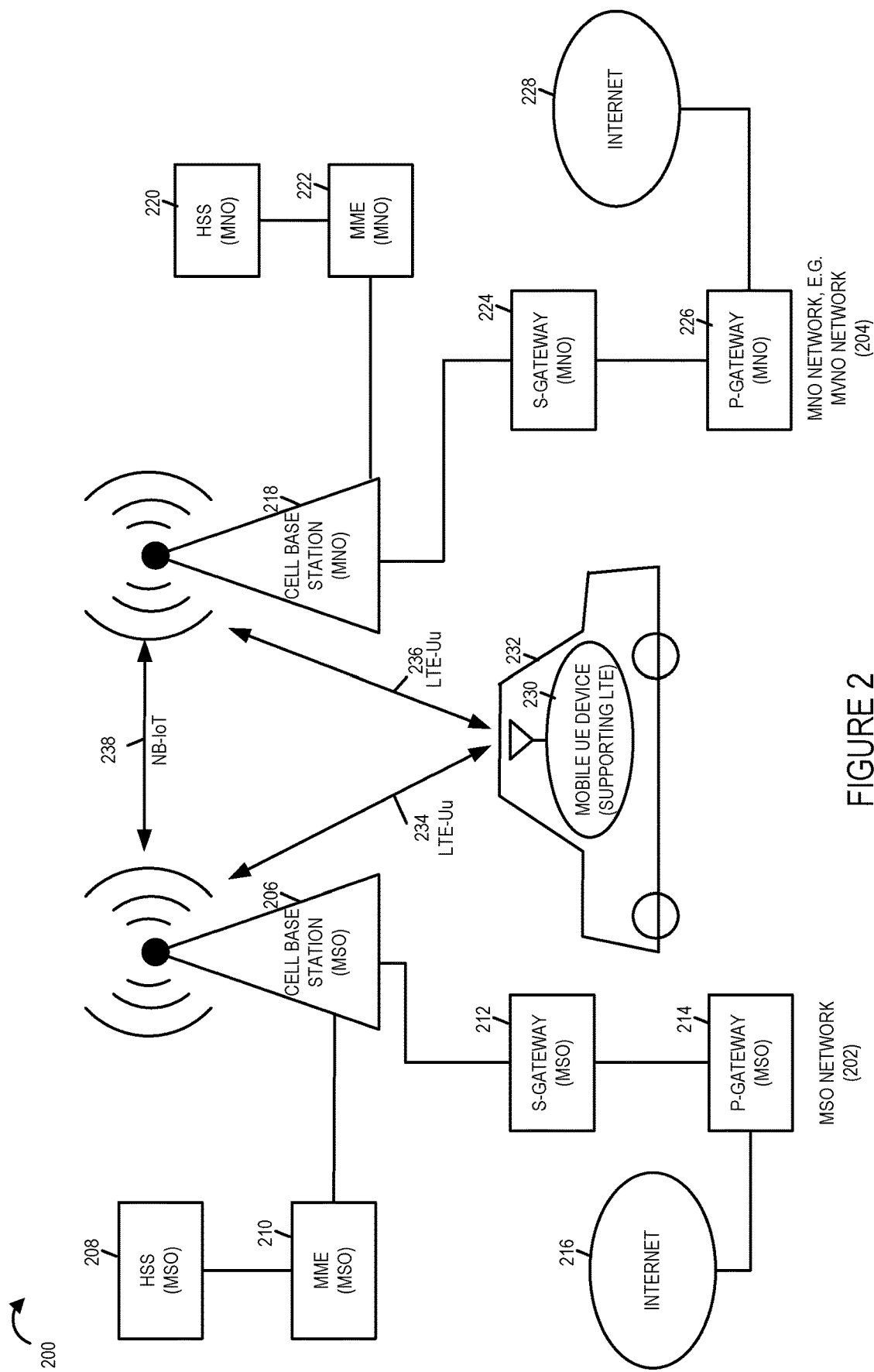
FIG. 2 is a drawing of an exemplary communications system in accordance with an exemplary embodiment.

FIG. 2 is a drawing of an exemplary communications system 200 in accordance with an exemplary embodiment. Exemplary communications system 200 includes a multiple system operator (MSO) network 202 and a mobile network operator (MNO) network 204, e.g., a mobile virtual network operator (MVNO) network. MSO network 202 includes cellular base station 206, e.g., an LTE base station, e.g. an eNodeB, a home subscriber server (HSS) 208, a mobility management entity (MME) 210, a S-Gateway 212, a P-Gateway 214 and Internet 216, coupled together as shown in FIG. 2. MNO network 204 includes a cellular base station 218, e.g., a LTE base station, e.g., an eNodeB, a Home Subscriber Server (HSS) 220, a Mobility Management Entity (MME) 222, a S-Gateway 224, a P-Gateway 226, and Internet 228 coupled together as shown in FIG. 2.

Exemplary communications system 200 of FIG. 2 further includes a plurality of user equipment (UE) devices including mobile UE device 230, which is currently located in vehicle 232. Mobile UE device 230 includes cellular, e.g., LTE, capabilities. Mobile UE device 230 can, and sometimes does, communicate with cellular base station 206 via LTE-Uu air interface 234. Mobile UE device 230 can, and sometimes does, communicate with cellular base station 210 via LTE-Uu air interface 236. The cellular base station 206 of the MSO network 202 can, and sometimes does, communicate with the cellular base station 218 of the MNO network 204 via NB-IoT interface 238.

Figure 3:
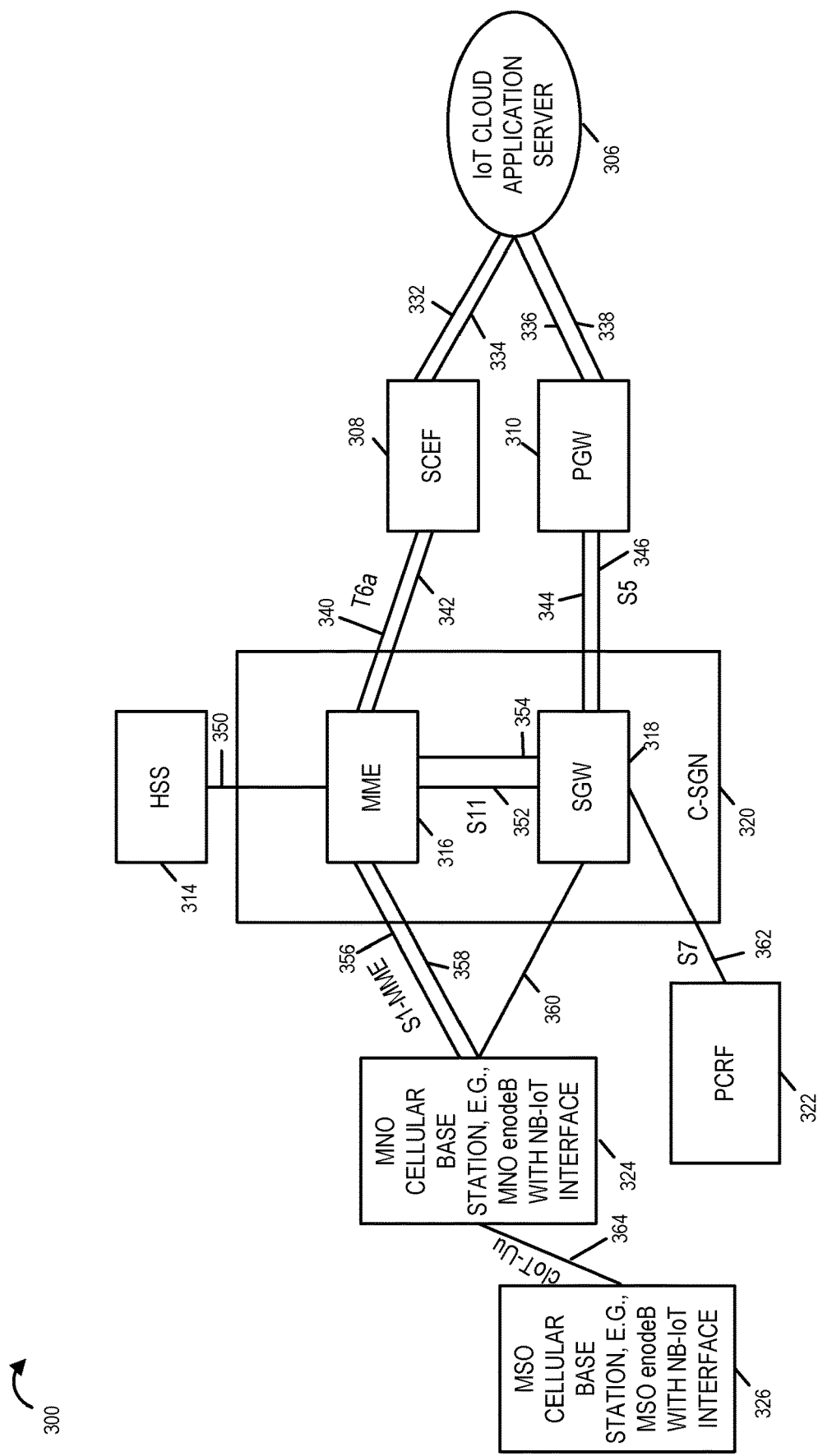
FIG. 3 is a drawing of exemplary system including NB-IoT architecture in accordance with an exemplary embodiment.

FIG. 3 is a drawing of exemplary system 300 including NB-IoT architecture in accordance with an exemplary embodiment. Exemplary system 300 includes architecture for providing a network management service for supporting managing MNO and MSO networks, which may be alternatively used by UEs, and for supporting handover of a UE, e.g., a communications session corresponding to the UE, between a cellular base station in a first one of the MNO network or MSO network to a cellular base station in a second one of the MNO or MSO network, in accordance with an exemplary embodiment. Exemplary system 300 includes an IoT cloud application server 306, a Service Capability Exposure Function (SCEF) 308, a Packet Gateway (PGW) 310, a Home Subscriber Server (HSS) 314, a Mobility Management Entity (MME) 316 and a Serving Gateway (SGW) 318. The MME 316 and SGW 318 are part of a Cellular IoT Serving Gateway Node (C-SGN) 320. Exemplary system 300 further includes a Policy and Charging Rules Function (PCRF) 322, a MNO cellular base station, e.g. an MNO eNodeB, with a NB-IoT interface 324, and a MSO cellular base station, e.g., a MSO eNodeB, with an NB-IoT interface 326. In one exemplary embodiment, the IoT cloud application server 306, the SCEF 308, the PGW 310, the HSS 314, the C-SGN 320 including MME 316 and SGW 318, the PCRF 322 and the MNO cellular base station 324 are including as part of a MNO system, and the MSO cellular base station 326 is part of a MSO network.

The MNO, in accordance with an exemplary embodiment, will run a service on its NB-IoT slice of the network. This service will provide connectivity between enodeBs of the MNO and MSO. For example, the service provides connectivity between exemplary MNO cellular base station 324 and exemplary MSO cellular base station 326. This approach, in accordance with a feature of various embodiments of the current invention, provides a direct path from one network to another allowing the two networks to share customer information such as UE capabilities, UE locations, UE context and some network related KPIs that would help in handover.

IoT cloud application server 306 facilitates and/or controls communication of handover related information between MNO and MSO networks, e.g., UE location information, UE context information, UE RF information, and KPIs information, e.g., using an NB-IoT communications link between a cellular base station in the MNO and a cellular base station in the MNO. IoT cloud application server 306 controls handover control handover of a UE, e.g. handover of one or more communications session for a UE between a base station in the MNO and a base station in the MSO, e.g. making handover decisions and/or sending and receiving handover messages.

IoT cloud application server 306 is coupled to SCEF 308 via links 332, 334. IoT cloud application server 306 is coupled to PGW 310 via links 336, 338. SCEF 308 is coupled to MME 316 via T6a connections 340, 342. PGW 310 is coupled to SGW 318 via S5 connections 344, 346. MME 316 is coupled to SGW 318 via S11 connections 352, 354. HSS 214 is coupled to MME 316 via link 350.

MME 316 is coupled to MNO cellular base station 324, e.g., a MNO enodeB, with NB-IoT interface, via S1-MME connections 356, 358. The MNO cellular base station 324, e.g., MNO eNodeB, with NB-IoT interface is also coupled to SGW 318 via link 360. PCRF 322 is coupled to SGW 318 via S7 connection 362.

The MNO cellular base station 324, e.g. MNO eNodeB, with NB-IoT interface is coupled to the MSO cellular base station 326, e.g., MSO eNodeB, with NB-IoT interface via one or more cIoT-Uu interface connections 364.

MNO HSS attached component 314 will keep information of MSO cellular base stations and may include or be coupled to a database will keep the information for clients with a subscription service. This storage of such information can be and sometimes is implemented for clients, i.e., clients of MSO cellular base stations.

Functions running on PCRF 322 and HSS 314 control, e.g., determine, how to charge a non-MNO (e.g., MSO), which is provided one or more services.

In some embodiments, the IoT cloud application server 306 is included as part of a device including an NB-IoT SCS in addition to the application server 306. In some embodiments, the SGW 318 and PGW 310 are including as part of a single device.

Figure 4:
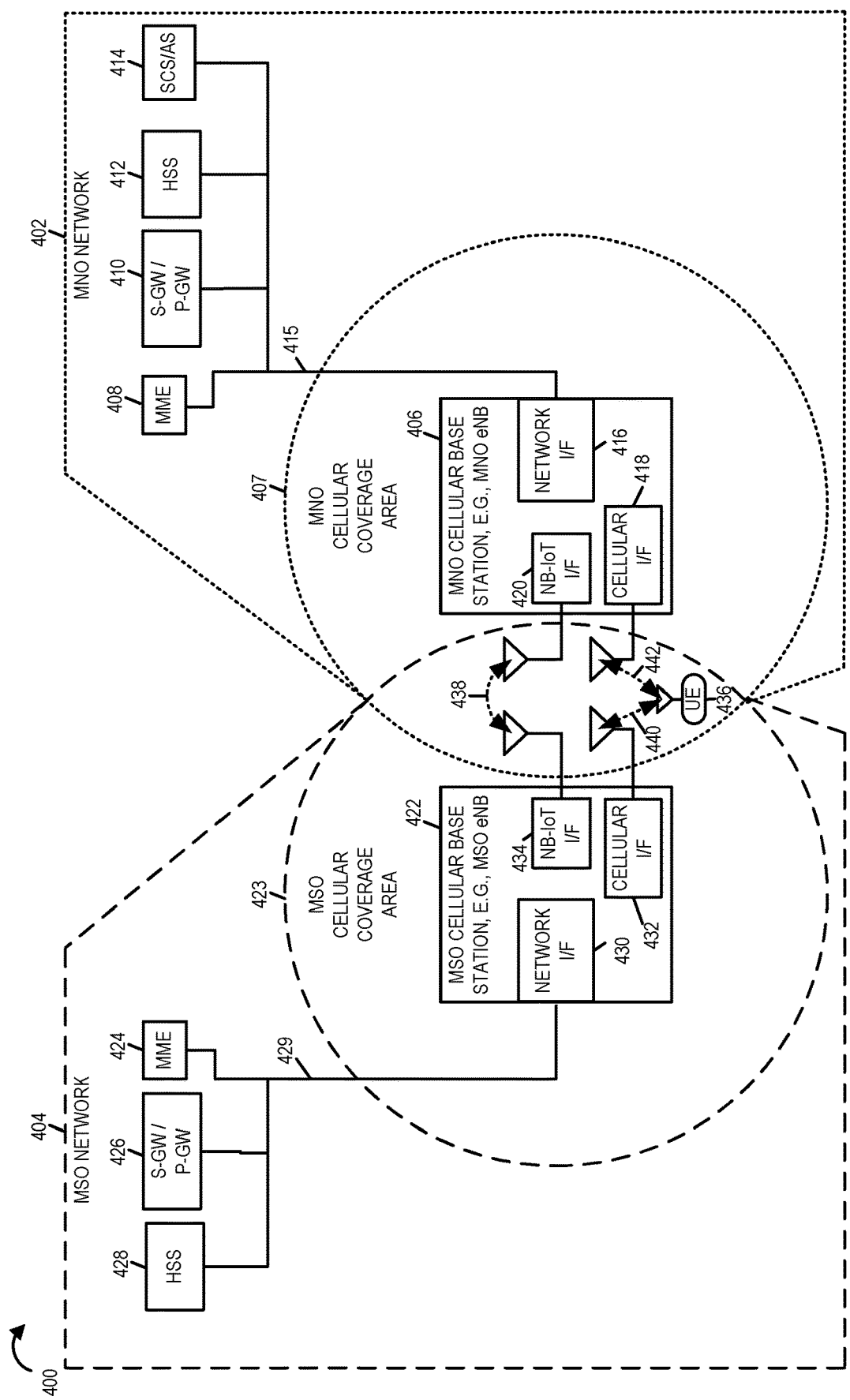
FIG. 4 is a drawing of an exemplary communications system in accordance with an exemplary embodiment.

FIG. 4 is a drawing of an exemplary communications system 400 in accordance with an exemplary embodiment. Exemplary communications system 400 includes a mobile network operator (MNO) network 402 and a multiple system operator (MSO) network 404. MNO network 402 includes a plurality of MNO cellular base stations including MNO cellular base station 406, e.g., a MNO eNB, with a corresponding MNO cellular coverage area 407, MME 408, S-GW/P-GW 410, HSS 412 and Service Capability Server/Application Server (SCS/AS) 414 coupled together via a network 415 over which the various devices of the MNO network 402 may interchange data and information. MSO network 404 includes a plurality of MSO cellular base stations including MSO cellular base station 422, e.g., a MSO eNB, with a corresponding MSO cellular coverage area 423, MME 424, S-GW/P-GW 426, and HSS 428 coupled together via a network 429 over which the various devices of the MSO network 404 may interchange data and information.

As shown in FIG. 4, the coverage area 407 of MNO cellular base station 406 partially overlaps the coverage area 423 of MSO cellular base station 422. In some embodiments the coverage area 423 of MSO cellular base station 422 is fully within the coverage area 407 of MNO cellular base station 406. In some such embodiments the coverage areas of a plurality of MSO cellular base stations including MSO cellular base station 422 are fully within the coverage area 407 of MNO cellular base station 406. In some embodiments the coverage area 407 of MNO cellular base station 406 is fully within the coverage area 423 of MSO cellular base station 422. In some such embodiments the coverage areas of a plurality of MNO cellular base stations including MNO cellular base station 406 are fully within the coverage area 423 of MSO cellular base station 422.

MNO cellular base station 406, e.g. a MNO eNodeB, includes a cellular interface (I/F) 418, a NB-IoT interface (I/F) 420 and a network interface 416. MSO cellular base station 422, e.g. a MSO eNodeB, includes a cellular interface (I/F) 432, a NB-IoT interface (I/F) 434 and a network interface 430.

Exemplary communications system 400 further includes a plurality of user equipment (UE) devices including UE 436. UE device 431 supports cellular communications, e.g., LTE cellular communications with cellular base stations of the MNO network 402 and cellular base stations of the MSO network 404. UE device 436 may, and sometimes does, communicate, via its cellular interface with cellular interface 418 of MNO cellular base station 418, e.g., sending and receiving LTE signals over wireless cellular communications link 442. UE device 436 may, and sometimes does, communicate, via its cellular interface with cellular interface 432 of MSO cellular base station 422, e.g., sending and receiving LTE signals over wireless cellular communications link 440.

MNO cellular base station 406 may, and sometimes does, communicate with MSO cellular base station 422, via NB-IoT interfaces (420, 434), respectively. Thus NB-IoT signals are communicated over NB-IoT wireless communications link 438 between the MNO cellular base station 406 and the MSO cellular base station 422. Exemplary NB-IoT signals communicate: requests for UE context, requests for UE RF information, requests for KPIs, reports communicating UE context, reports communicating UE RF information and KPIs, reports communicating measurements, requests for handover, response to handover requests, and/or other handover related signaling.

In some embodiments, the same antenna(s) are used for both the cellular I/F 418 and NB-IoT interface 420 of MNO cellular base station 406. In some embodiments, the same antenna(s) are used for both the cellular I/F 432 and NB-IoT interface 434 of MSO cellular base station 422.

Figure 5:
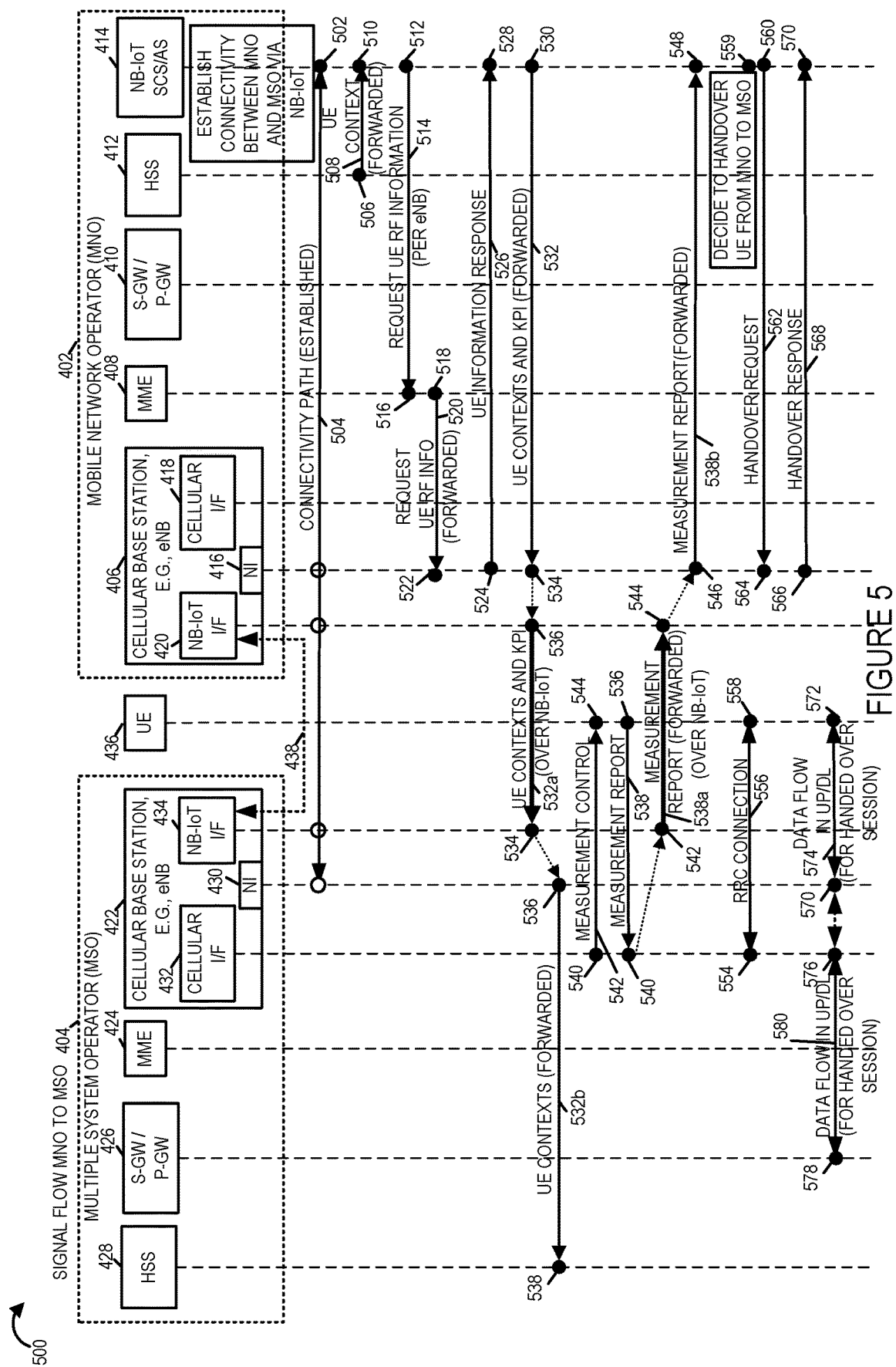
FIG. 5 is drawing illustrating elements of exemplary system of FIG. 4 and exemplary steps and signaling flows for an example including a handover of a UE from a cellular base station of a MNO network to a cellular base station of a MSO network in accordance with an exemplary embodiment, wherein some of the signaling related to handover decisions, handover preparation and/or handover operations is communicated via a NB-IoT wireless communications link between a base station, e.g., an eNodeB, in MNO network and an base station, e.g. an eNode B, in the MSO network.

FIG. 5 is drawing 500 illustrating elements of exemplary system of FIG. 4 and exemplary steps and signaling flows for an example including a handover of a UE 436 from a cellular base station 406 of a MNO network 402 to a cellular base station 422 of a MSO network 404 in accordance with an exemplary embodiment, wherein some of the signaling related to handover decisions, handover preparation and/or handover operations is communicated via a NB-IoT wireless communications link 438 between a base station 406, e.g., an eNodeB, in MNO network 402 and an base station 422, e.g. an eNode B, in the MSO network 404.

In step 502 the NB-IoT SCS/AS 414 is operated to establish connectivity between the MNO 402 and the MSO 404, wherein the connectivity path (established) 504 includes a NB-IoT connection 438 between a cellular base station 406 in the MNO 402 and a cellular base station 422 in the MSO network 404.

In the example of FIG. 5, it is assumed that UE 436 is communicating with cellular interface 418 of cellular base station 406 of MNO 402, e.g. sending and receiving wireless cellular signals conveying data, e.g., UL/DL traffic signals, as part of one or more ongoing communications sessions.

In step 502 HSS 408 generates and sends signal 508 to SCS/AS 414, which forwards UE context regarding UE 436 to the SCS/AS 414. In step 510 SCS/AS 510 receives signal 508, recovers the communicated UE context data/information and stores the recovered UE context data/information. In step 512 the SCS/AS 414 generates and sends request message 514 to MME 408, the request message requesting UE RF information (corresponding to UE 426) per eNB. In step 516 the MME 408 receives the request 514 for UE RF information. In step 518, the MME forwards the request for UE RF information to cellular base station 406, as message 520. In step 522 cellular base station 406 receives, via its network interface 416, the forwarded request for UE RF information 520. In step 524, the cellular base station 406 generates and sends, e.g., via its network interface 416, UE information response message 526 including UE RF information for UE 436, e.g., including KPIs, to the SCS/AS 414. In step 428 the SCS/AS receives the UE information response message 526 and recovers the communicated information.

In step 530 the SCS/AS 414 generates and sends signals 532, including UE contexts and KPIs (corresponding to UE 436), directed to the HSS 428 of the MSO 404, the UE contexts and KPIs to be communicated via a communications path including a NB-IoT segment over NB-IoT communications link 438 between the cellular base station 406 of the MNO and the cellular base station 422 of the MSO 404. The generated signal 532 including UE contexts and KPIs includes information aggregated from step 510 and step 528.

In step 534, signal 532 conveying the forwarded UE contexts and KPIs is received via the network interface 416 of cellular base station 406. In step 536 the cellular base station 406 of MNO 402 generates NB-IoT signals 532a conveying the UE contexts and KPIs which are being forwarded, and transmits the NB-IoT signals 532a via NB-IoT communications link 438 to the cellular base station 422 of MSO 404. In step 534, the cellular base station 422 receives NB-IoT signals 532a, via its NB-IoT interface 434, and recovers the communicated information including the UE contexts and KPIs being forwarded. In some embodiments, the cellular base station stores the received forwarded UE RF information and/or KPIs. In some embodiments, the cellular base station 422 sends, via its network interface 430 received UE RF information and/or KPIs to MME 424. In step 536 the cellular base station 422 generates message 532b, conveying the UE contexts being forwarded, and sends message 532b, via network interface 430 to HSS 538. In step 538, HSS 428 receives and recovers the forwarded UE contexts.

In step 540 cellular base station 422 generates a cellular wireless downlink signal 542 conveying measurement control information, e.g. a measurement request message, to UE 436, and sends the signal 542 to UE 436 via a cellular downlink transmission via the transmitter of its cellular interface 432. In step 544 UE 436 receives measurement control signal 542 and recovers the communicated control information. In step 536 UE 436 performs measurements in accordance with the received control information, generates a measurement report in accordance with the received control information, generates uplink cellular signals 538 communicating the generated measurement report and transmits the generated uplink signals 538 conveying the generated measurement report to the cellular base station 422 of the MSO 404. In step 540 the cellular base station 422 receives, via a receiver of its cellular interface 432, the uplinks signals 538 conveying the measurement report, and recovers the communicated measurement report.

In step 542, the cellular base station 422 of the MSO 404 generates and sends NB-IoT signals 538a, conveying a forwarded copy of the measurement report of signal 538, via NB-IoT communications link 438 to cellular base station 406 of MNo 402, with the intended final destination for the measurement report being the SCS/AS 414. In step 544 cellular base station 406 receives, via its NB-IoT interface 420, NB-IoT signals 538a conveying the measurement report, and recovers the communicated measurement report. In step 546 the cellular base station 406 generates and sends, via network interface 416, message 538b communicating the forwarded measurement report to SCS/AS 414. In step 548 the SCS/AS 414 receives message 538b and recovers the measurement report from the MSO.

In steps 554 and 558 the cellular base station 422 of MSO 404 and the UE 436 establish and/or operate radio resource control (RRC) connection 556.

In step 559, e.g., based on information received in steps 510, 528 and 548, the SCS/AS 414 decides to handover UE 436 from the cellular base station 406 of the MNO 402 to the cellular base station 422 of the MSO 404, with regard to one or more ongoing communications session corresponding to UE 436.

In step 560 the SCS/AS 414 generates and sends a handover request message 562 to cellular base station 406. In step 564 the cellular base receives the handover request message. In step 566 the cellular base station 406 makes a decision, e.g., a decision to agree to the handover request, generates a handover response message 568 and sends the handover response message to the SCS/AS 414. In step 570 the SCS/AS 414 receives the handover response message 568, e.g., indicating the handover request is granted.

In steps 570 and steps 572 the cellular base station 422 of the MSO 404 and the UE 436 communicate cellular data flow signals 574 in UL/DL for the handed over communications session(s) corresponding to UE 436. In steps 576 and steps 578 the cellular base station 422 of the MSO 404 and the S-GW/P-GW 426 of the MSO 404 communicate data flow backhaul signals 580 for UL/DL communication for the handed over communications session corresponding to UE 436.

Figure 6A:
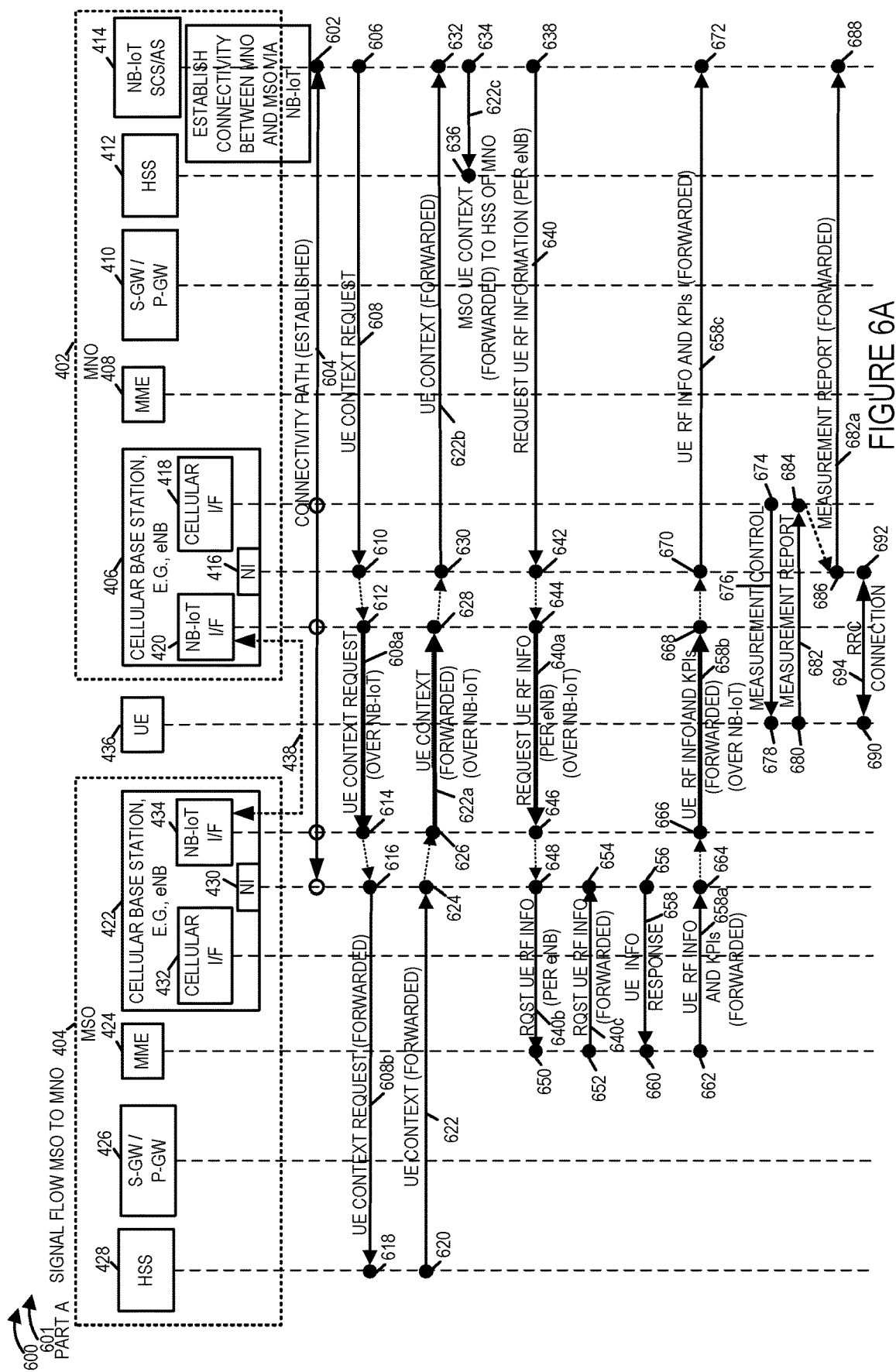
FIG. 6A is a first part of a drawing illustrating elements of exemplary system of FIG. 4 and exemplary steps and signaling flows for an example including a handover of a UE from a cellular base station of a MSO network to a cellular base station of a MNO network in accordance with an exemplary embodiment, wherein some of the signaling related to handover decisions, handover preparation and/or handover operations is communicated via a NB-IoT wireless communications link between a base station, e.g., an eNodeB, in MSO network and an base station, e.g. an eNode B, in the MNO network.

FIG. 6, comprising the combination of FIG. 6A and FIG. 6B a drawing 600, comprising Part A 601 and Part B 603, illustrating elements of exemplary system of FIG. 4 and exemplary steps and signaling flows for an example including a handover of a UE 436 from a cellular base station 422 of a MSO network 404 to a cellular base station 406 of a MNO network 402 in accordance with an exemplary embodiment, wherein some of the signaling related to handover decisions, handover preparation and/or handover operations is communicated via a NB-IoT wireless communications link 438 between a base station 422, e.g., an eNodeB, in MSO network 404 and a base station 406, e.g. an eNode B, in the MNO network 402.

In step 602 the NB-IoT SCS/AS 414 is operated to establish connectivity between the MNO network 402 and the MSO network 404, wherein the connectivity path (established) 604 includes a NB-IoT connection 438 between a cellular base station 406 in the MNO 402 and a cellular base station 422 in the MSO network 404.

In the example of FIG. 6, it is assumed that UE 436 is communicating with cellular interface 432 of cellular base station 422 of MNO network 404, e.g. sending and receiving wireless cellular signals conveying data, e.g., UL/DL traffic signals, as part of one or more ongoing communications sessions.

In step 606 the SCS/AS 414 generates and sends message 608 including a UE context request, regarding UE 436, to the MSO network 404, said request being sent via a communications path including a path portion over a NB-IoT communications link 438 coupling the MNO network 402 to the MSO network 404. In step 406 message 608 including UE context request 608 is generated and sent by SCS/AS 414 to cellular base station 406. In step 610 cellular base station 406 receives, via its network interface 416, message 608 including the UE context request. In step 612 cellular base station 406 of MNO network 402 generates NB-IoT signals 608a communicating the context request of message 608, and transmits, via its NB-IoT interface 420, the NB-IoT signals 608a over NB-IoT communications link 438, to the cellular base station 422 of MSO network 404. In step 614 cellular base station 422 receives, via its NB-IoT interface 434, the NB-IoT signals 608a conveying the UE context request, and recovers the communicated information. In step 616 the cellular base station 422 generates and transmits, via its network interface 430, message 608b communicated a forwarded copy of the received UE context request. In step 618 the HSS 428 of the MSO network 404 receives message 608b and recovers the request. In step 622, HSS 428, in response to the received UE context request of message 608b, retrieves stored context information corresponding to UE 436, generates a UE context message 622 and sends the generated UE context message 622 along a path toward the SCS/AS 414, said path including the NB-IoT communications link 438. In step 624, the UE context message 622 is received by cellular base station 422, via its network interface 430. In step 626 the cellular base station 422 of MSO network 402 generates NB-IoT signals 622a including the UE context of message 622 which is being forwarded, and transmits the generated NB-IoT signals 622a via its NB-IoT interface 434 over NB-IoT communications link 438 to cellular base station 406 of MNO network 402. In step 628, the cellular base station 406 receives the NB-IoT signals 622a and recovers the context information which is being forwarded. In step 630 the cellular base station 406 generates and sends, via its network interface 416, UE context message 622b to SCS/AS 414. In step 632 SCS/AS 414 receives UE context message 622b. In step 634 SCS/AS 414 generates and sends message 622c to HSS 412 of MNO 402, message 622c communicating the MSO sourced UE context which is being forwarded. In step 636 HSS 412 receives message 622c and recovers the UE context information.

In step 638 the SCS/AS 414 generates and sends message 640 including a request for UE RF information, e.g., regarding UE 436, per eNB to the MSO network 404, said request being sent via a communications path including a path portion over a NB-IoT communications link 438 coupling the MNO network 402 to the MSO network 404. In step 638 message 650 including a request for UE RF information per eNB, is generated and sent by SCS/AS 414 to cellular base station 406. In step 642 cellular base station 406 receives, via its network interface 416, message 640 including the request for UE RF information per eNB. In step 644 cellular base station 406 of MNO network 402 generates NB-IoT signals 640a communicating the request for UE RF information per eNB of message 640, and transmits, via its NB-IoT interface 420, the NB-IoT signals 640a over NB- IoT communications link 438, to the cellular base station 422 of MSO network 404. In step 646 cellular base station 422 receives, via its NB-IoT interface 434, the NB-IoT signals 640a conveying the request for UE RF information per eNB, and recovers the communicated information. In step 648 the cellular base station 422 generates and transmits, via its network interface 430, message 640b communicated a forwarded copy of the received request for UE RF information per eNB. In step 650 the MME 424 of the MSO network 404 receives message 640b and recovers the request for UE RF information. In step 652 MME 424 generates and sends message 640c, including the request for UE RF information to cellular base station 422. In step 654, cellular base station 422 receives message 654 and recovers the request for UE RF information. In step 656, in response to the received request of step 654, cellular base station 422 retrieves UE RF information, e.g. corresponding to UE 436, generates UE information response message 658, e.g. including UE RF information and KPIs, and sends message 658 to MME 424.

In step 660 MME 424 receives the UE information response message 658 and recovers the communicated information. In step 622 MME 424 generates and sends message 658a, which includes a forwarded copy of the RF information and KPIs communicated from cellular base station 422 in response message 658, message 658a being sent toward the SCS/AS 414 of the MNO network 402 along a communications path including NB-IoT communications link 438. In step 664, cellular base station 422 of MSO 404 receives, via its network interface 430, message 658a. In step 666 cellular base station 422 of MSO network 404 generates NB-IoT signals 658b including the RF information and KPIs being forwarded, and transmits, via its NB-IoT interface 434, the NB-IoT signals over the NB-IoT communications link 438 to cellular base station 406 of MNO network 402. In step 668 cellular base station 406 receives, via its NB-IoT interface 420, NB-IoT signals 658 communicating the UE RF information and KPIs. In step 670 the cellular base station 406 generates message 658c including the UE RF information and KPIs from the MSO network which are being forwarded, and sends the generated message 658c, via its network interface 416, to SCS/AS 414. In step 672 the SCS/AS 414 receives message 658c, which is a response to message 640, and recovers and stores the communicated UE RF information and KPIs.

In step 674 the cellular base station 406 generates and transmits, via its cellular interface 418, cellular downlink wireless signals 676 communicating in measurement control information to UE 436. In step 678 UE 436 receives cellular signals 676, recovers the measurement control information, and performs measurements in accordance with the received control information. In step 680 UE 436 generates a measurement report, in accordance with the received control information, based the performed measurements, and transmits in the cellular wireless uplink signals 682 communicating the generated measurement report to base station 406. In step 684 cellular base station 406 receives, via its cellular interface 418 uplink signals 682 including the measurement report and recovers the communicated information. In step 686 the cellular base station 406 generates and sends, via network interface 416, message 682a including the measurement report, which is being forwarded, to SCS/AS 414. In step 688 the SCS/AS 414 receives message 682a and recovers and stores the measurement report.

In steps 690 and 692 the UE 436 and the cellular base station 406 of MNO 402 establish and/or operate RRC connection 694.

In step 695, e.g., based on information received in steps 632, 672 and 688, the SCS/AS 414 decides to handover UE 436 from the cellular base station 422 of the MSO network 404 to the cellular base station 406 of the MNO network 402, with regard to one or more ongoing communications session corresponding to UE 436.

In step 696 the SCS/AS 414 generates and sends a handover request message 698 directed to cellular base station 422 of the MSO network 404. In step 700 the cellular base station 406 of MNO 402 receives handover request message 698 via its network interface 416. In step 702 cellular base station 406 of MNO 402 generates NB-IoT signals 698a including a forwarded copy of the handover request of the received handover request message 698, and transmits the generated NB-IoT signals 698a via its NB-IoT interface 420 over NB-IoT communications link 438 to cellular base station 422 of MSO network 404. In step 704, cellular base station 422 receives NB-IoT signals 698a via its NB-IoT interface 434 and recovers the handover request sent from the SCS/AS 696. In step 706, in response to the received handover request, the cellular base station generates NB-IoT signals 708 including a handover response message, e.g., communicating that the handover request is granted, and transmits, via its NB-IoT interface 434, NB-IoT signals 708 including the handover response message, to cellular base station 406 of MNO network 402 via NB-IoT communications link 438.

In step 710 cellular base station 406 receives, via its NB-IoT interface 420, NB-IoT signals 708 and recovers the communicated handover response message. In step 712 base station 406 sends, via its network interface 416, handover response message 708a to SCA.AS 414. In step 714 SCS/AS 414 receives handover response message 708a, which is a response to handover request message 698, and recovers the communicated information, e.g. handover request is granted.

In steps 716 and steps 718 the UE 436 and the cellular base station 406 of the MNO network 402 communicate cellular data flow signals 720 in UL/DL for the handed over communications session(s) corresponding to UE 436. In steps 722 and steps 724 the cellular base station 406 of the MNO network 402 and the S-GW/P-GW 410 of the MNO network 402 communicate data flow backhaul signals 726 for UL/DL communication for the handed over communications session(s) corresponding to UE 436.

Figure 7A:
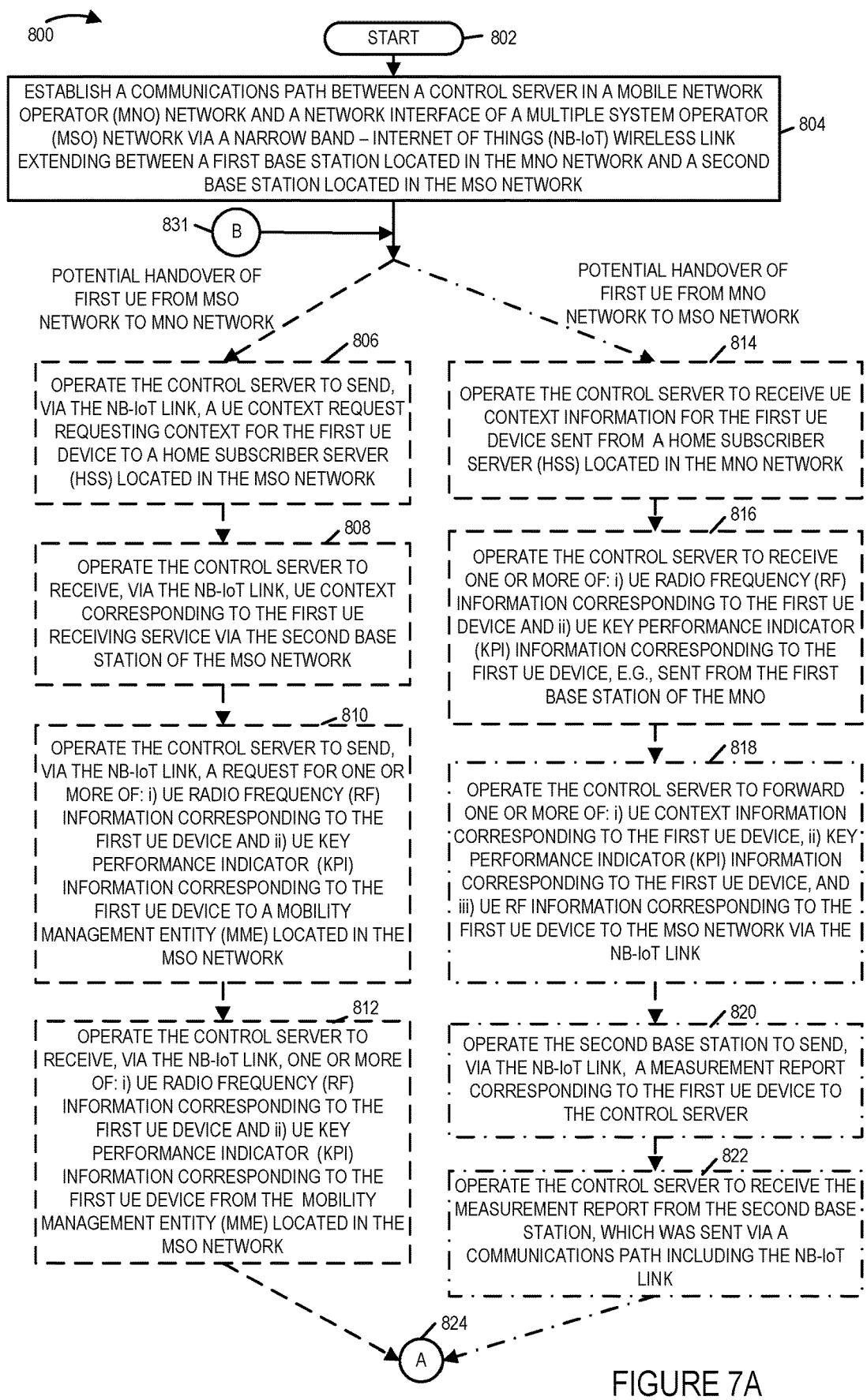
FIG. 7A is a first part of a flowchart of an exemplary communications method in accordance with an exemplary embodiment.

FIG. 7, comprising the combination of FIG. 7A and FIG. 7B, is a flowchart 800 of an exemplary communications method in accordance with an exemplary embodiment. Operation starts in step 802 in which a communications system, e.g., communications system 400 of FIG. 4, is powered on an initialized. The communications system is, e.g., a communications system including a MNO network, which supports cellular communications and NB-IoT communications, and a MSO network, which supports cellular communications and NB-IoT communications. Operation proceeds from step 802 to step 804.

In step 804 a communications path is established between a control server in a mobile network operator (MNO) network and a network interface of a multiple system operator (MSO) network via a Narrow Band-Internet of Things (NB-IoT) wireless link extending between a first base station located in the MNO network and a second base station located in the MSO network. In some embodiments, the first and second base stations are cellular base stations. In some such embodiments, the first and second base stations are LTE base stations. Operation proceeds from step 804 to step 806 and/or step 814. Operation proceeds from step 804 to step 806 for potential handover of a first UE device from MSO network to MNO network. Operation proceeds from step 804 to step 816 for potential handover of the first UE device from the MNO network to the MSO network.

In step 806 the control server is operated to send, via the NB-IoT link, a UE context request requesting context for the first UE device, to a home subscriber server (HSS) located in the MSO network. Operation proceeds from step 806 to step 808 in step 808 the control server is operated to receive, via the NB-IoT link, UE context corresponding to the first UE device receiving service via the second base station of the MSO network. Operation proceeds from step 808 to step 810. In step 810 the control server is operated to send, via the NB-IoT communications link, a request for one or more or all of: i) UE radio frequency (RF) information corresponding to the first UE device and ii) UE key performance indicator (KPI) information corresponding to the first UE device to a mobility management entity (MME) located in the MSO network. Operation proceeds from steep 810 to step 812.

In step 812 the control server is operated to receive, via the NB-IoT link, one or more of i) UE radio frequency (RF) information corresponding to the first UE device and ii) UE key performance indicator (KPI) information corresponding to the first UE device from the MME located in the MSO network. Operation proceeds from step 812, via connecting node A 824 to step 826.

Returning to step 814, in step 814 the control server is operated to receive UE context information for the first UE device send from a home subscriber server (HSS) located in the MNO network. Operation proceeds from step 814 to step 816. In step 816 the control server is operated to receive one or more of: i) UE radio frequency information corresponding to the first UE device and ii) UE key performance indicator information (KPI) corresponding to the first UE device, e.g. sent from the first base station of the MNO network. Operation proceeds from step 816 to step 818. In step 818 the control server is operated to forward one or more or all of: i) UE context information corresponding to the first UE device, ii) key performance indicator (KPI) information corresponding to the first UE device, and iii) UE RF information corresponding to the first UE device to the MSO network via the NB-IoT link. In some embodiments, the UE context information corresponding to the first UE device is forwarded to a HSS in the MSO network; and the key performance indicator (KPI) information corresponding to the first UE device and/or UE RF information corresponding to the first UE device are forwarded to the MME in the MSO network and/or the second base station in the MSO network. Operation proceeds from step 818 to step 820. In step 820 the second base station sends, via the NB-IoT link, a measurement reports corresponding to the first UE device to the control server. Operation proceeds from step 820 to step 822. In step 822 the control server is operated to receive the measurement report from the second base station, which was sent via a communications path including the NB-IoT link. Operation proceeds from step 822, via connecting node A 824 to step 826.

In step 826 the control server makes a decision whether or not to initiate a handover of the first UE device receiving services via a serving base station to a target base station. Each iteration of step 826 includes one of step 830 and 828.

In step 830 the control server makes a decision not to initiate a handover of the first UE device and operation proceeds from step 830 via connecting node B 831 to the input of step 806 or 814.

In step 828 the control server makes a decision to initiate a handover of the first UE device receiving services via a serving base station to a target base station. Each iteration of step 828 includes one of step 832 and 834, depending upon which of the first and second base stations is the serving base station and which is the target base station with regard to the handover.

In step 832 the control server makes a decision to initiate a handover of the first UE device receiving services from the second base station of the MSO network to the first base station of the MNO network. In this case, the serving base station is the second base station of the MSO network and the target base station is the first base station of the MNO network, and steps 806, 808, 810, and 812 were previously performed.

In step 834 the control server makes a decision to initiate a handover of the first UE device receiving services from the first base station of the MNO network to the second base station of the MSO network. In this case, the serving base station is the first base station of the MNO network and the target base station is the second base station of the MSO network, and steps 814, 816, 818, 820, and 822 were previously performed.

Operation proceeds from step 828 to step 836. In step 836 the control server communicates a handover request to the serving base station. Each iteration of step 836 includes one of step 838 and 840. If operation proceeded to step 832 in response to step 832 being performed, then step 838 is performed. However, if operation proceeded to step 836 in response to step 834 being performed, then step 840 is performed.

In step 838 the control is operated to communicate the handover request to the second base station located in the MSO network via the NB-IoT wireless link extending between the first base station located in the MNO network and the second base station located in the MSO network. Operation proceeds from step 838 to step 842. In step 842 the control server is operated to receive a handover response communicated via the NB-IoT link between the first base station located in the MNO network and the second base station located in the MSO network. Operation proceeds from step 842 to step 844. In step 844 the first base station is operated to establish a radio bearer channel is established between the first UE device and the first base station of the MNO network. Operation proceeds from step 844 to step 846. In step 846 the first base station is operated to communicate data corresponding to a session in which the first UE device is a participant, and which was handed off to the MNO network from the MSO network, via a cellular interface of the first base station. The first base station of the MNO network is now a serving base station for the first UE device. Operation proceeds from step 846, via connecting node B 854 to step 814.

Returning to step 840, in step 840 the control server is operated to communicate the handover request to the first base station located in the MNO network without the handover request traversing the NB-IoT link. Operation proceeds from step 840 to step 848.

In step 848 the control server is operated to receive a handover response from the serving base station, which is the first base station, indicating that the handover to the target base station, which is the second base station, is proceeding or has been completed. Operation proceeds from step 848 to step 850. In step 850 the second base station is operated to establish a radio bearer channel between the first UE device and the second base station. In some embodiments, step 850 precedes step 848. Operation proceeds from step 850 to step 852. In step 852 the second base station is operated to communicate data for a session in which the first UE device is a participant following the handover from the first base station of the MNO network to the second base station of the MSO network. The second base station of the MSO network is now a serving base station for the first UE device. Operation proceeds from step 846, via connecting node B 854 to step 806.

In one exemplary embodiment, with regard to the systems, networks, and devices described in flowchart 800 of FIG. 7, the communications system is system 400, the MNO network is MNO network 402, the MNO network is MNO network 404, the first UE device is UE 436, the first base station is MNO cellular base station 406, the second base station is MSO cellular base station 426, the NB-IoT link is NB-IoT link 438, the MME of the MNO network is MME 408, the MME of the MSO network is MME 424, the HSS of the MNO network is HSS 412, the HSS of the MSO network is HSS 428, and the control server is the SCS/AS server 414.

Figure 8:
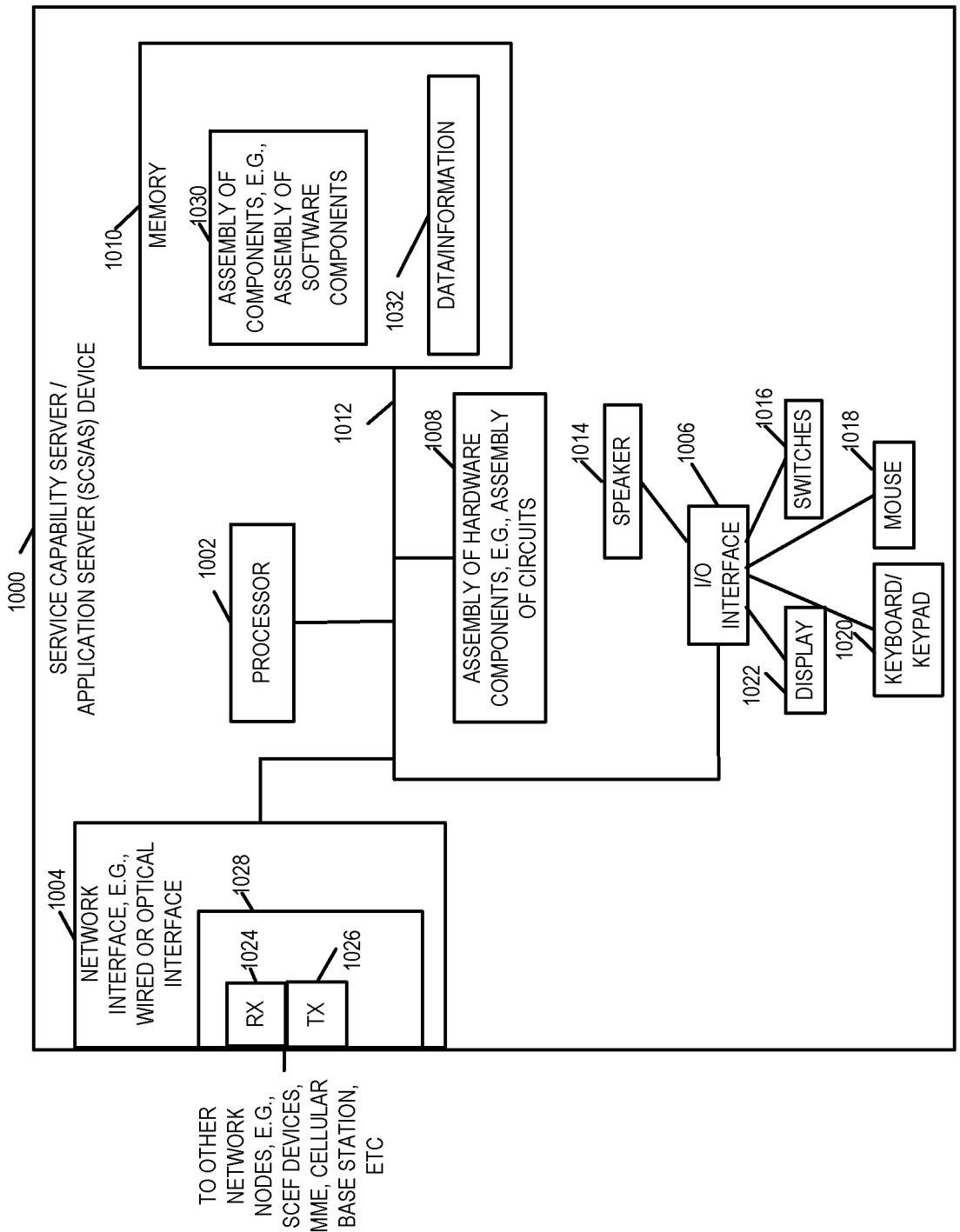
FIG. 8 is a drawing of an exemplary service capability server/application server (SCS/AS) in accordance with an exemplary embodiment.

FIG. 8 is a drawing of an exemplary service capability server/application server (SCS/AS) device 1000 in accordance with an exemplary embodiment. Exemplary SCS/AS device 1000 of FIG. 8 is, e.g., any of SCS/AS 414 of FIGS. 4, 5, and 6, or IoT cloud application server 306 of FIG. 3. Exemplary SCS/AS device 1000 includes a processor 1002, e.g., a CPU, a network interface 1004, e.g., a wired or optical interface, an I/O interface 1006, an assembly of hardware component 1008, e.g., an assembly of circuits, and memory 1010 coupled together via bus 1012 over which the various elements (1002, 1004, 1006, 1008, 1010) may interchange data and information. SCS/AS device 1000 further includes a speaker 1014, switches 1016, a mouse 1018, keyboard/keypad 1020, and display 1022, coupled to I/O interface 1006, via which the various I/O devices (1014, 1016, 1018, 1020, 1022) may interchange data and information with elements (1002, 1004, 1008, 1010). Network interface 1004 includes a receiver 1024, via which the SCS/AS device 1000 may receive signals, e.g., including messages, from other network nodes and a transmitter 1026 via which the SCS/AS device 1000 may send signals, e.g., including messages, to other network nodes. In some embodiments, the receiver 1024 and transmitter 1026 are included as part of a transceiver 1028. Exemplary network nodes include a service capability exposure function (SCEF) device, a mobility management entity (MME), and a cellular base station. Memory 1010 includes assembly of components 1030, e.g., an assembly of software components, and data/information 1032.

In some embodiments, SCS/AS device 1000 is alternatively implemented as two distinct devices, e.g., a SCS device and an AS device, which are coupled together. In some such embodiments, the SCS device and AS device each include a network interface including a receiver and a transmitter, a processor, an I/O interface, I/O devices, an assembly of hardware components, and a memory including a assembly of components and data/information.

Figure 9:
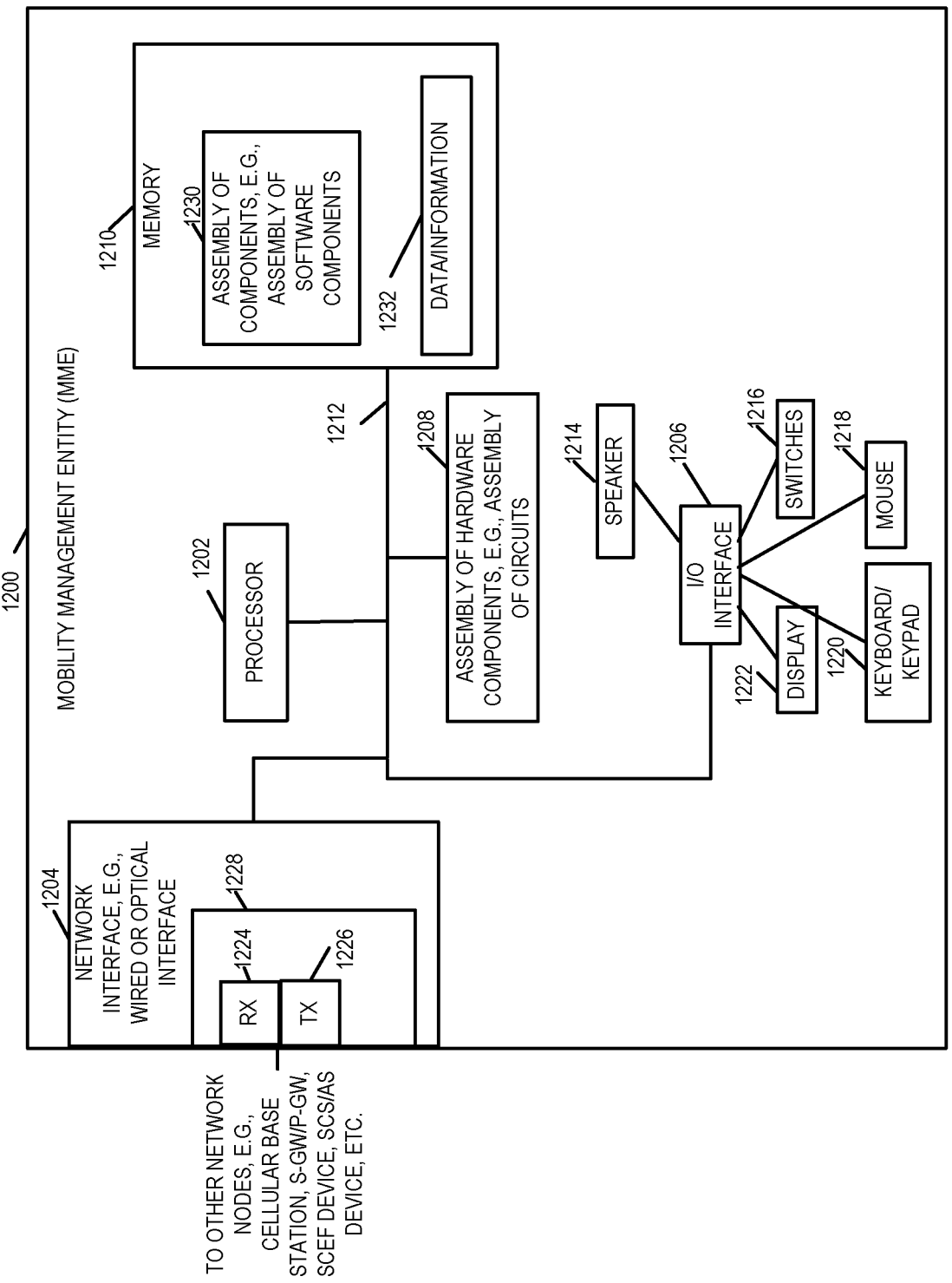
FIG. 9 is a drawing of an exemplary mobility management entity (MME) in accordance with an exemplary embodiment.
Figure 10:
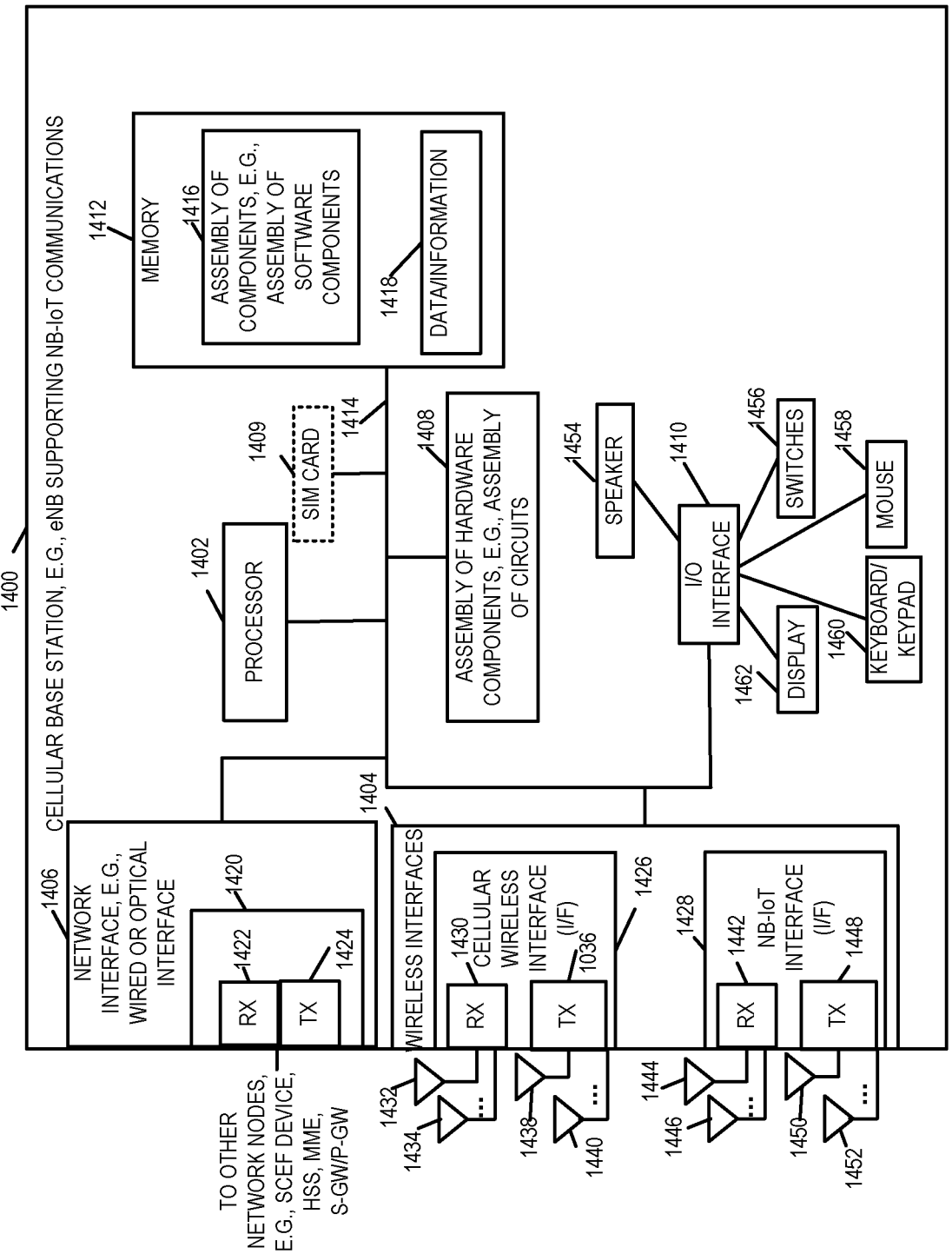
FIG. 10 is a drawing of an exemplary cellular base station, e.g., an eNodeB (eNB), supporting Narrow Band-Internet of Things (NB-IoT) communications in accordance with an exemplary embodiment.

FIG. 9 is a drawing of an exemplary mobility management entity (MME) 1200 in accordance with an exemplary embodiment. MME 1200 of FIG. 10 is, e.g. MNO MME 408 of FIGS. 4, 5 and 6, MSO MME 424 of FIGS. 4, 5 and 6, MNO MME 316 of FIG. 3, MNO MME 222 of FIG. 2 or MSO MME 210 of FIG. 2. Exemplary MME 1200 includes a processor 1202, e.g., a CPU, a network interface 1204, e.g., a wired or optical interface, an I/O interface 1206, an assembly of hardware component 1208, e.g., an assembly of circuits, and memory 1210 coupled together via bus 1212 over which the various elements (1202, 1204, 1206, 1208, 1210) may interchange data and information. MME 1200 further includes a speaker 1214, switches 1216, a mouse 1218, keyboard/keypad 1220, and display 1222, coupled to I/O interface 1206, via which the various I/O devices (1214, 1216, 1218, 1220, 1222) may interchange data and information with elements (1202, 1204, 1208, 1210). Network interface 1204 includes a receiver 1224, via which the MME 1200 may receive signals, e.g., including messages, from other network nodes and a transmitter 1226 via which the MME 1200 may send signals, e.g., including messages, to other network nodes. In some embodiments, the receiver 1224 and transmitter 1226 are included as part of a transceiver 1228. Exemplary network nodes include a SCS/AS device, a service capability exposure function (SCEF) device, a mobility management entity (MME), a S-GW/P-GW, and a cellular base station. Memory 1210 includes assembly of components 1230, e.g., an assembly of software components, and data/information 1232.

Figure 12:
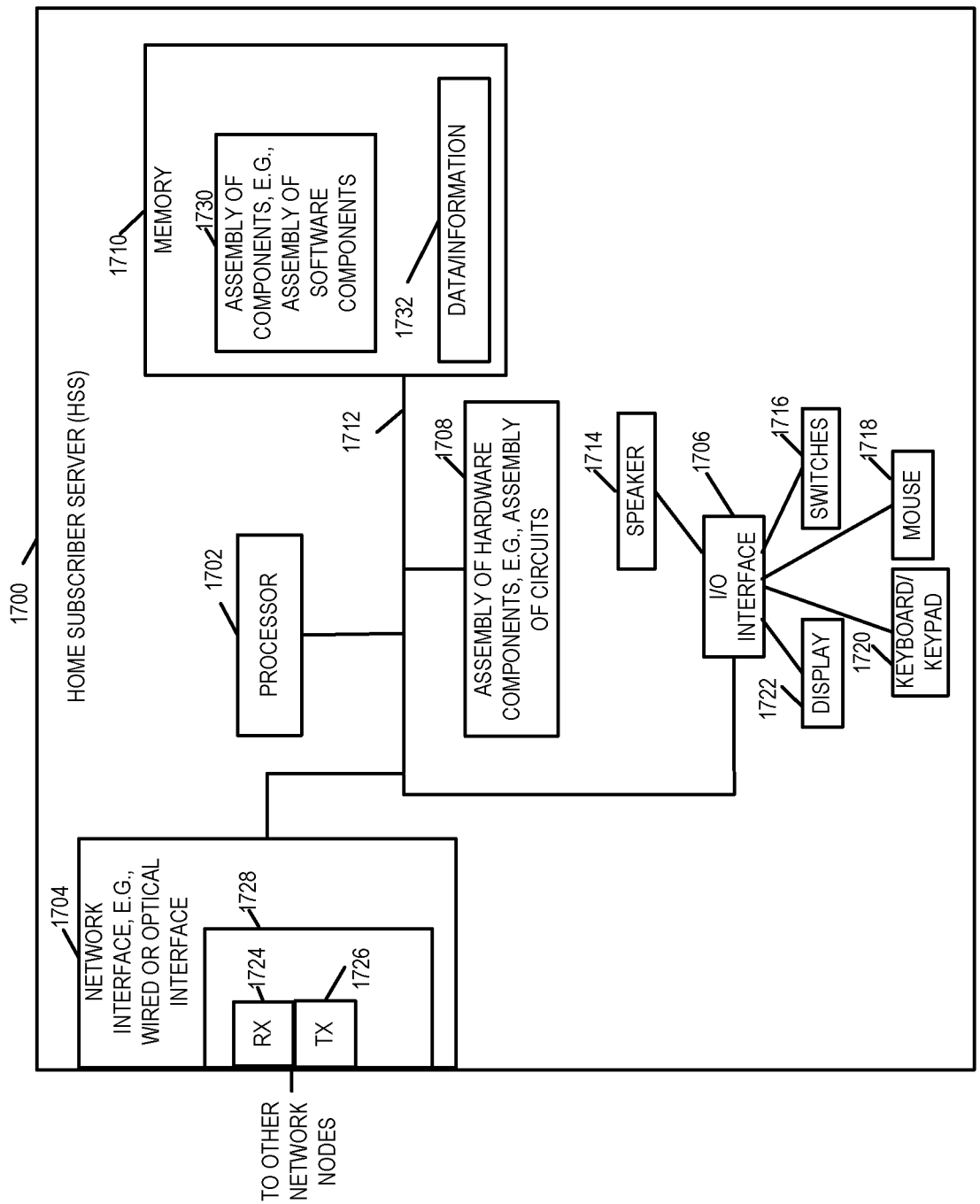
FIG. 12 is a drawing of an exemplary home subscriber server (HSS) in accordance with an exemplary embodiment.
Figure 13:
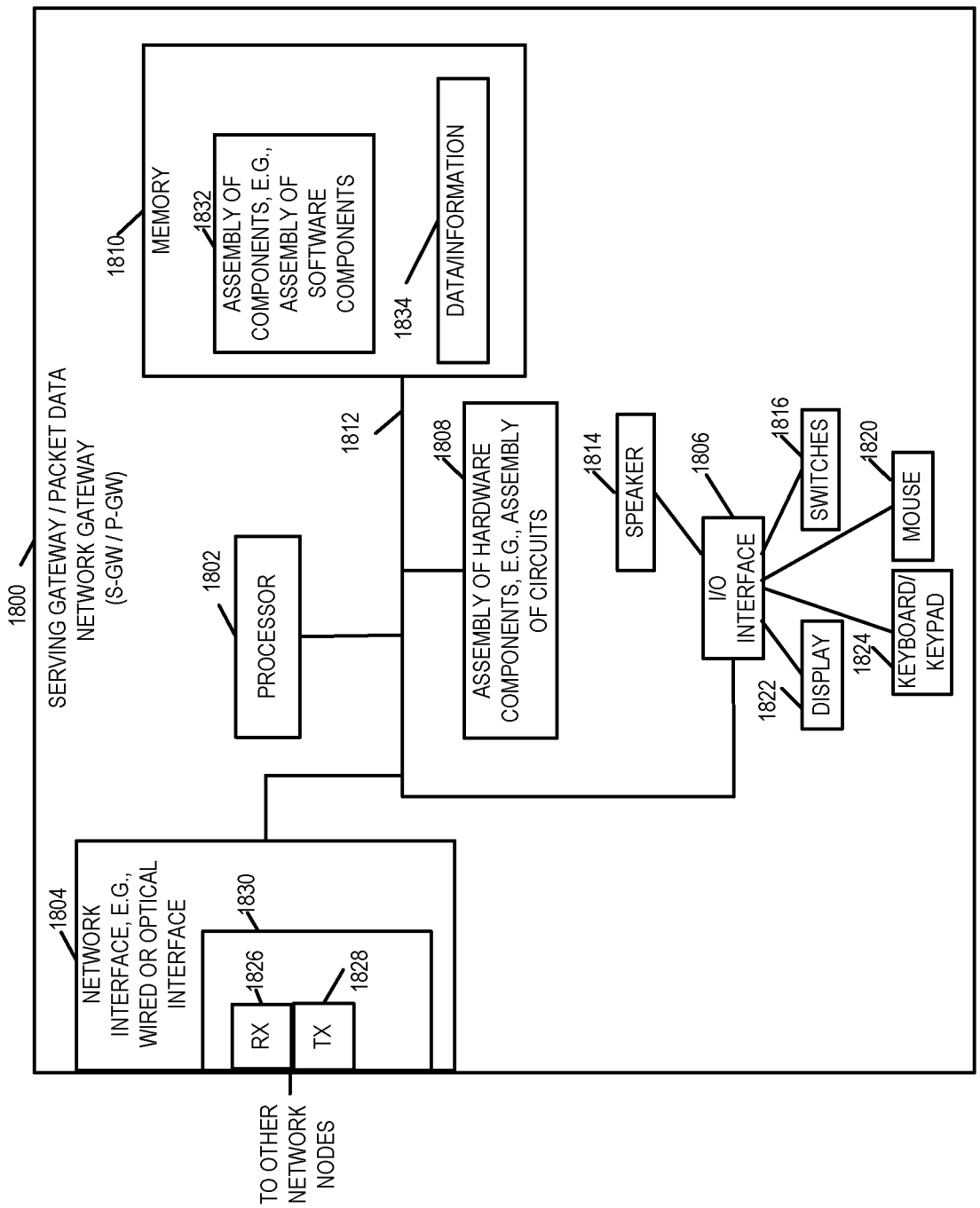
FIG. 13 is a drawing of an exemplary serving gateway/packet data network gateway (S-GW/P-GW) in accordance with an exemplary embodiment.

FIG. 12 is a drawing of an exemplary cellular base station 1400, e.g., an eNodeB (eNB), supporting Narrow Band-Internet of Things (NB-IoT) communications in accordance with an exemplary embodiment. Cellular base station 1400 of FIG. 12 is, e.g., MNO cellular base station 406 of FIGS. 4, 5 and 6, MSO cellular base station 422 of FIGS. 4, 5 and 6, MNO cell base station 218 of FIG. 2, MSO cell base station 206 of FIG. 2, or MNO cell base station 324 of FIG. 3 or MSO cell base station 326 of FIG. 3. Exemplary cellular base station 1400 includes a processor 1402, e.g., a CPU, a wireless interfaces 1404, a network interface 1406, e.g., a wired or optical interface, an I/O interface 1410, an assembly of hardware component 1408, e.g., an assembly of circuits, and memory 1412 coupled together via bus 1414 over which the various elements (1402, 1404, 1406, 1408, 1412) may interchange data and information. In some embodiments cellular base station 1400 further includes a SIM card 1409 coupled to bus 1414. Cellular base station 1400 further includes a speaker 1454, switches 1456, a mouse 1458, keyboard/keypad 1460, and display 1462, coupled to I/O interface 1410, via which the various I/O devices (1454, 1456, 1458, 1460, 1462) may interchange data and information with elements (1402, 1404, 1406, 1408, 1409, 1412).

Wireless interfaces 1404 includes a cellular wireless interface 1426 and a NB-IoT wireless interface 1428. Cellular wireless interface 1426 includes a receiver 1430 coupled to one or more receive antennas (1432, ..., 1434) via which the cellular base station 1400 may receive cellular wireless signals from UE devices. Cellular wireless interface 1426 includes a transmitter 1036 coupled to one or more transmit antennas (1438, ..., 1440) via which the cellular base station 1400 may transmit cellular wireless signals to UE devices. In some embodiments, the same antenna or antennas are used for the cellular wireless transmitter and the cellular wireless receiver.

NB-IoT wireless interface 1428 includes a receiver 1442 coupled to one or more receive antennas (1444, ..., 1446) via which the cellular base station 1400 may receive NB-IoT signals from another cellular wireless base station, supporting NB-IoT communications. NB-IoT wireless interface 1428 includes a transmitter 1448 coupled to one or more transmit antennas (1450, ..., 1452) via which the cellular base station 1400 may transmit NB-IoT wireless signals to another cellular wireless base station, supporting NB-IoT communications. In some embodiments, the same antenna or antennas are used for the NB-IoT wireless transmitter and the NB-IoT wireless receiver. In some embodiments, the same antenna or antennas are used by the cellular wireless interface 1426 and the NB-IoT wireless interface 1428.

Network interface 1406 includes a receiver 1422, via which the cellular base station 1400 may receive signals, e.g., including messages, from other network nodes and a transmitter 1424 via which the cellular base station 1400 may send signals, e.g., including messages. Exemplary network nodes coupled to cellular base station 1400 via network interface 1406 include a SCEF device, a HSS, a MME, a S-GW/P-GW, In some embodiments, the receiver 1422 and transmitter 1424 are included as part of a transceiver 1420. Memory 1412 includes assembly of components 1416, e.g., an assembly of software components, and data/information 1418.

Figure 11:
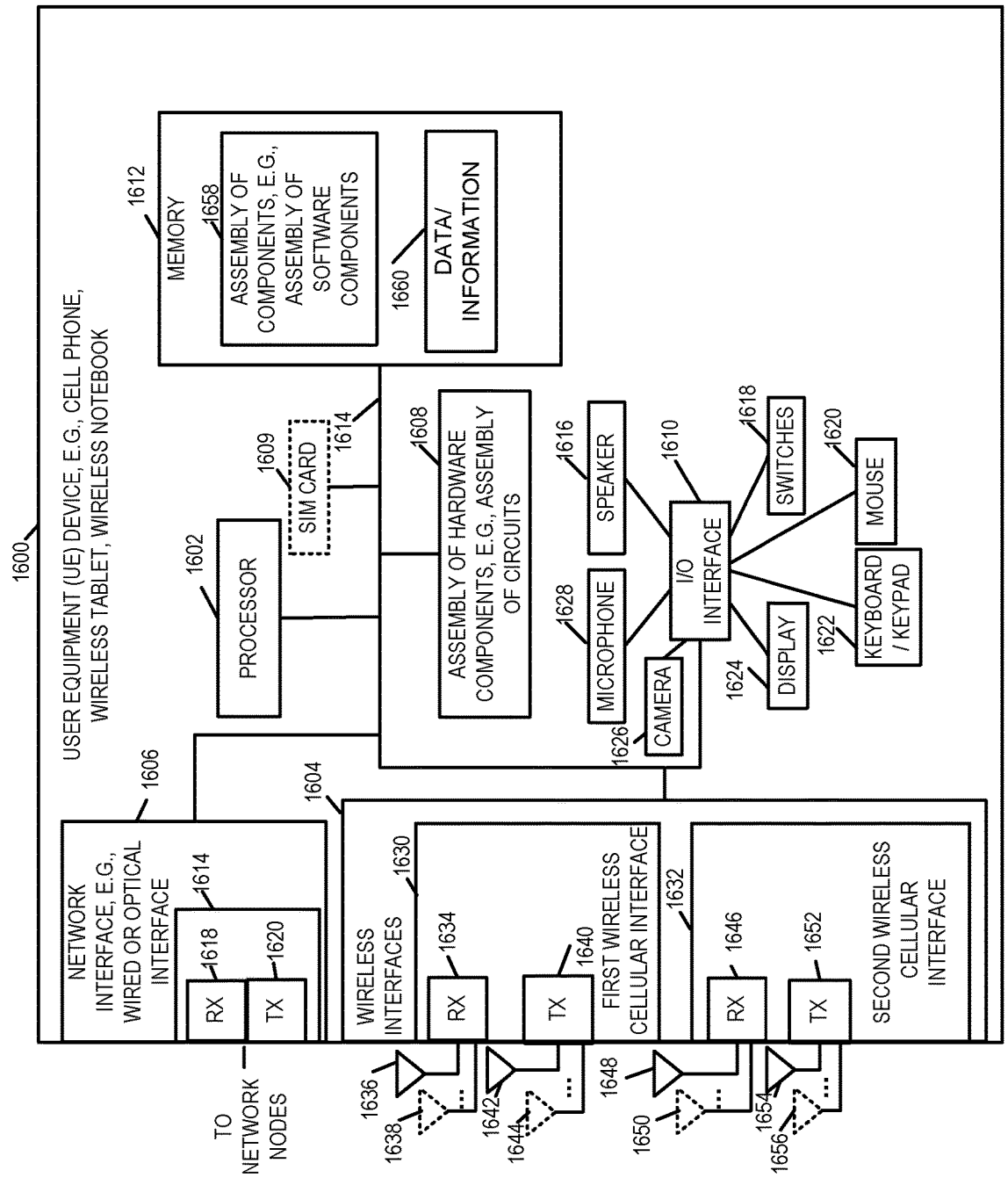
FIG. 11 is a drawing of an exemplary user equipment (UE) device, e.g., a cell phone, wireless tablet, wireless notebook, in accordance with an exemplary embodiment.

FIG. 11 is a drawing of an exemplary user equipment (UE) device 1600, e.g., a cell phone, wireless tablet, wireless notebook, etc., supporting cellular, e.g., LTE communications, with MNO networks and MSO networks, in accordance with an exemplary embodiment. UE device 1600 of FIG. 14 is, e.g., UE 436 of FIGS. 4, 5 and 6, or mobile UE device 230 of FIG. 2. Exemplary UE device 1600 includes a processor 1602, e.g., a CPU, a wireless interfaces 1604, a network interface 1606, e.g., a wired or optical interface, an I/O interface 1610, an assembly of hardware component 1608, e.g., an assembly of circuits, and memory 1612 coupled together via bus 1614 over which the various elements (1602, 1604, 1606, 1608, 1610, 1612) may interchange data and information. In some embodiments UE device 1600 further includes a SIM card 1609 coupled to bus 1614. UE device 1600 further includes a speaker 1616, switches 1618, a mouse 1620, keyboard/keypad 1622, display 1626, e.g., a touch-screen display, camera 1626 and microphone 1628 coupled to I/O interface 1610, via which the various I/O devices (1616, 1618, 1620, 1622, 1624, 1626, 1628) may interchange data and information with elements (1602, 1604, 1606, 1608, 1609, 1612).

Wireless interfaces 1604 includes a first wireless cellular interface 1630 and a second wireless cellular interface 1632. First cellular wireless interface 1630 includes a receiver 1634 coupled to one or more receive antennas (1636, . . . , 1638) via which the UE 1600 may receive cellular wireless signals from cellular base stations, e.g. cellular base stations in a MNO network. Cellular wireless interface 1630 includes a transmitter 1640 coupled to one or more transmit antennas (1642, . . . , 1644) via which the UE device 1600 may transmit cellular wireless signals to cellular base stations, e.g., cellular base stations in a MNO network. In some embodiments, the same antenna or antennas are used for the cellular wireless transmitter and the cellular wireless receiver.

Second wireless interface 1632, includes a receiver 1646 coupled to one or more receive antennas (1448, . . . , 1650) via which the UE device 1600 may receive cellular wireless signals, from a cellular base station, e.g., a cellular base station in a MSO network. Second cellular wireless interface 1632 includes a transmitter 1652 coupled to one or more transmit antennas (1654, . . . , 1656) via which the UE device 1600 may transmit cellular wireless signals to a cellular base station, e.g., a cellular base station in a MSO. In some embodiments, the same antenna or antennas are used for the cellular wireless transmitter 1646 and the cellular wireless receiver 1652. In some embodiments, the same antenna or antennas are used by the first cellular wireless interface 1630 and the second cellular wireless interface 1632.

Network interface 1606 includes a network receiver 1618, and a network transmitter 1620, via which the UE device 1600 may, and sometimes does, communicate with network nodes, via a wired or optical communications link. In some embodiments, the receiver 1618 and transmitter 1620 are included as part of a transceiver 1614. Memory 1612 includes assembly of components 1658, e.g., an assembly of software components, and data/information 1660.

Figure 15:
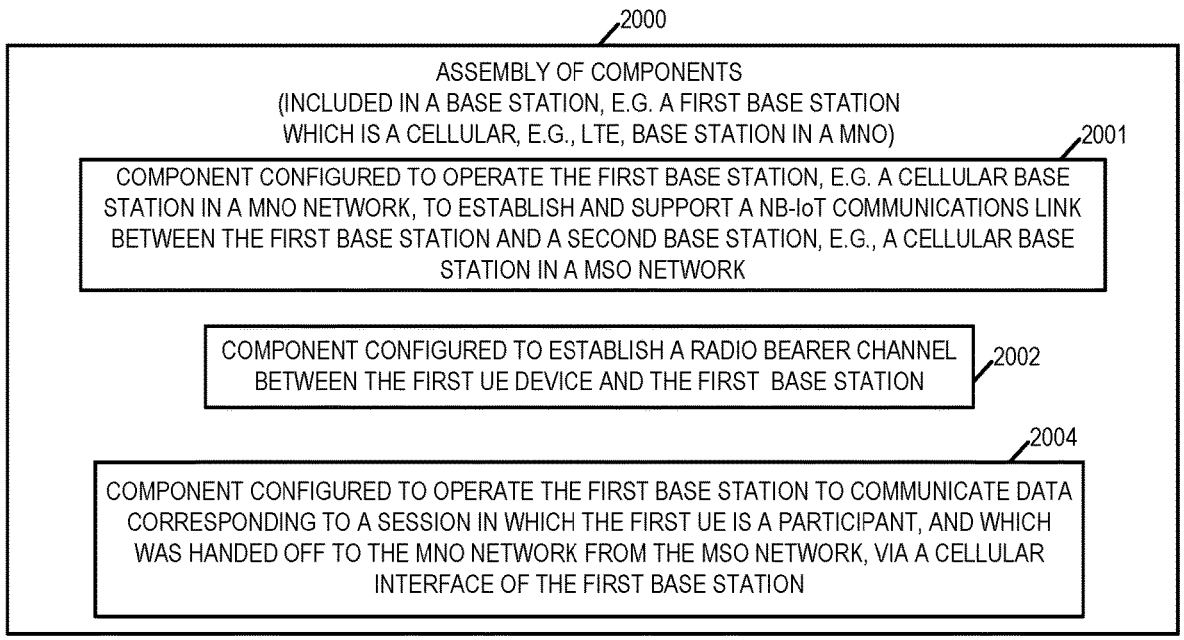
FIG. 15 is a drawing of an exemplary assembly of components which may be included in an exemplary base station, e.g. a first base station, in a MNO network, in accordance with an exemplary embodiment.

FIG. 15 is a drawing of an exemplary home subscriber server (HSS) 1700 in accordance with an exemplary embodiment. HSS 1700 of FIG. 15 is, e.g. MNO HSS 428 of FIGS. 4, 5, and 6, MSO HSS 412 of FIGS. 4, 5, and 6, MNO HSS 220 of FIG. 2, MSO HSS 210 of FIG. 2 or MNO HSS 314 of FIG. 3. Exemplary HSS 1700 includes a processor 1702, e.g., a CPU, a network interface 1704, e.g., a wired or optical interface, an I/O interface 1706, an assembly of hardware component 1708, e.g., an assembly of circuits, and memory 1710 coupled together via bus 1712 over which the various elements (1702, 1704, 1706, 1708, 1710) may interchange data and information. HSS 1700 further includes a speaker 1714, switches 1716, a mouse 1718, keyboard/keypad 1720, and display 1722, coupled to I/O interface 1706, via which the various I/O devices (1714, 1716, 1718, 1720, 1722) may interchange data and information with elements (1702, 1704, 1708, 1710). Network interface 1704 includes a receiver 1724, via which the HSS 1700 may receive signals, e.g., including messages, from other network nodes and a transmitter 1726 via which the HSS 100 may send signals, e.g., including messages, to other network nodes. In some embodiments, the receiver 1724 and transmitter 1726 are included as part of a transceiver 1728. Memory 1710 includes assembly of components 1730, e.g., an assembly of software components, and data/information 1732.

Figure 16:
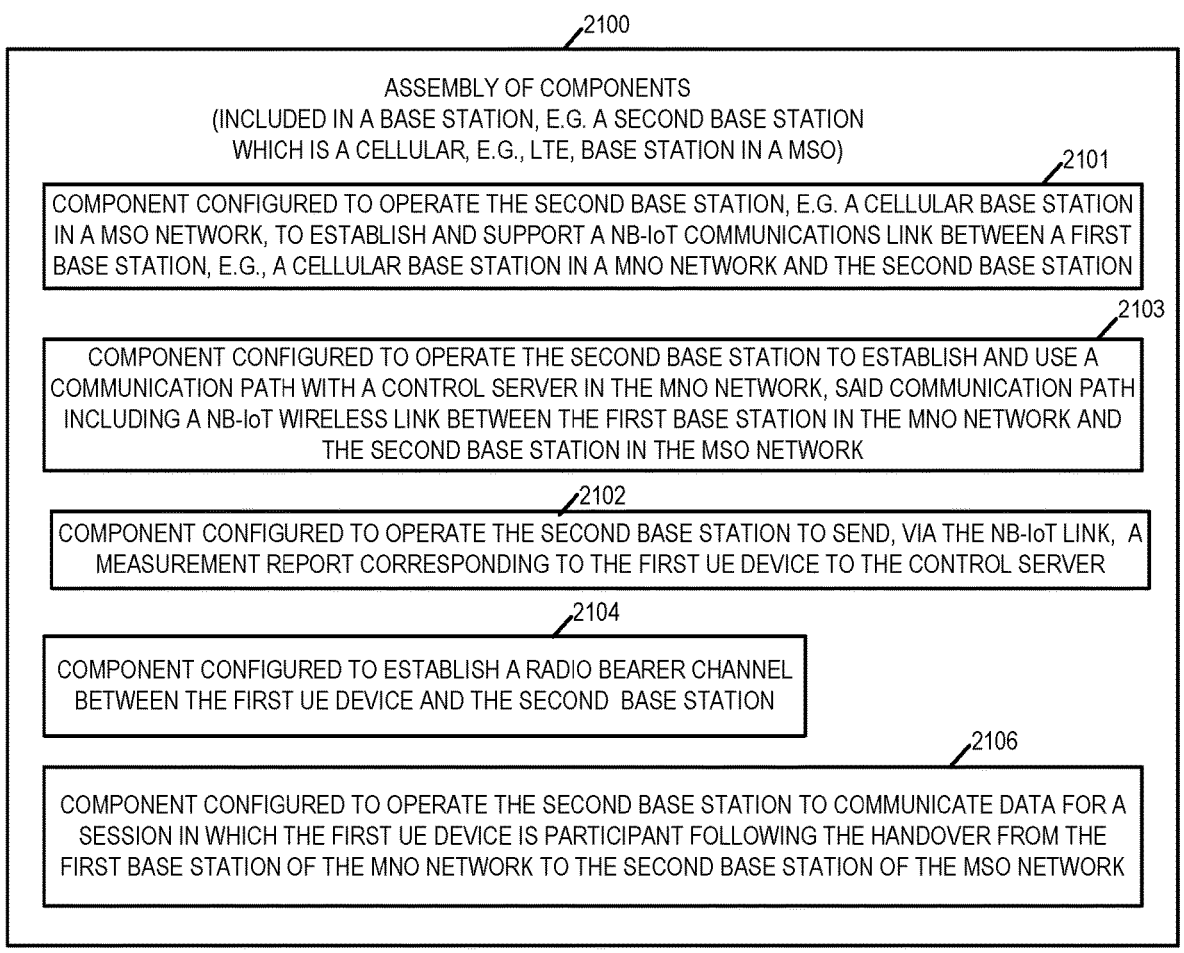
FIG. 16 is a drawing of an exemplary assembly of components which may be included in an exemplary base station, e.g. a second base station, in a MSO network, in accordance with an exemplary embodiment.

FIG. 16 is a drawing of an exemplary serving gateway/packet data network gateway (S-GW/P-GW) 1800 in accordance with an exemplary embodiment. S-GW/P-GW device 1800 of FIG. 16 is, e.g., MNO S-GW/P-GW 410 of FIGS. 4, 5 and 6, MSO S-GW/P-GW 426 of FIGS. 4, 5 and 6, the combination of MNO S-gateway 224 and MNO P-gateway 226 of FIG. 2, the combination of MSO S-gateway 212 and MSO P-gateway 214 of FIG. 2, or the combination of MNO SGW 318 and MNO PGW 310 of FIG. 3, Exemplary S-GW/P-GW device 1800 includes a processor 1802, e.g., a CPU, a network interface 1804, e.g., a wired or optical interface, an I/O interface 1806, an assembly of hardware component 1808, e.g., an assembly of circuits, and memory 1810 coupled together via bus 1812 over which the various elements (1802, 1804, 1806, 1808, 1810) may interchange data and information. S-GW/P-GW device 1800 further includes a speaker 1814, switches 1816, a mouse 1818, keyboard/keypad 1820, and display 1822, coupled to I/O interface 1806, via which the various I/O devices (1814, 1816, 1818, 1820, 1822) may interchange data and information with elements (1802, 1804, 1808, 1810). Network interface 1804 includes a receiver 1826, via which the S-GW/P-GW device 1800 may receive signals, e.g., including messages, from other network nodes and a transmitter 1628 via which the S-GW/P-GW device 1800 may send signals, e.g., including messages, to other network nodes. In some embodiments, the receiver 1826 and transmitter 1828 are included as part of a transceiver 1830. Memory 1810 includes assembly of components 1832, e.g., an assembly of software components, and data/information 1834.

In some embodiments, S-GW/P-GW device 1800 is alternatively implemented, e.g., in a cellular, e.g., 3GPP, network, as two distinct devices, e.g., a S-GW device and a P-GW device, which are coupled together within cellular network. In some such embodiments, the S-GW device and P-GW device each include a network interface including a receiver and a transmitter, a processor, an I/O interface, I/O devices, an assembly of hardware components, and a memory including a assembly of components and data/information.

Figure 14A:
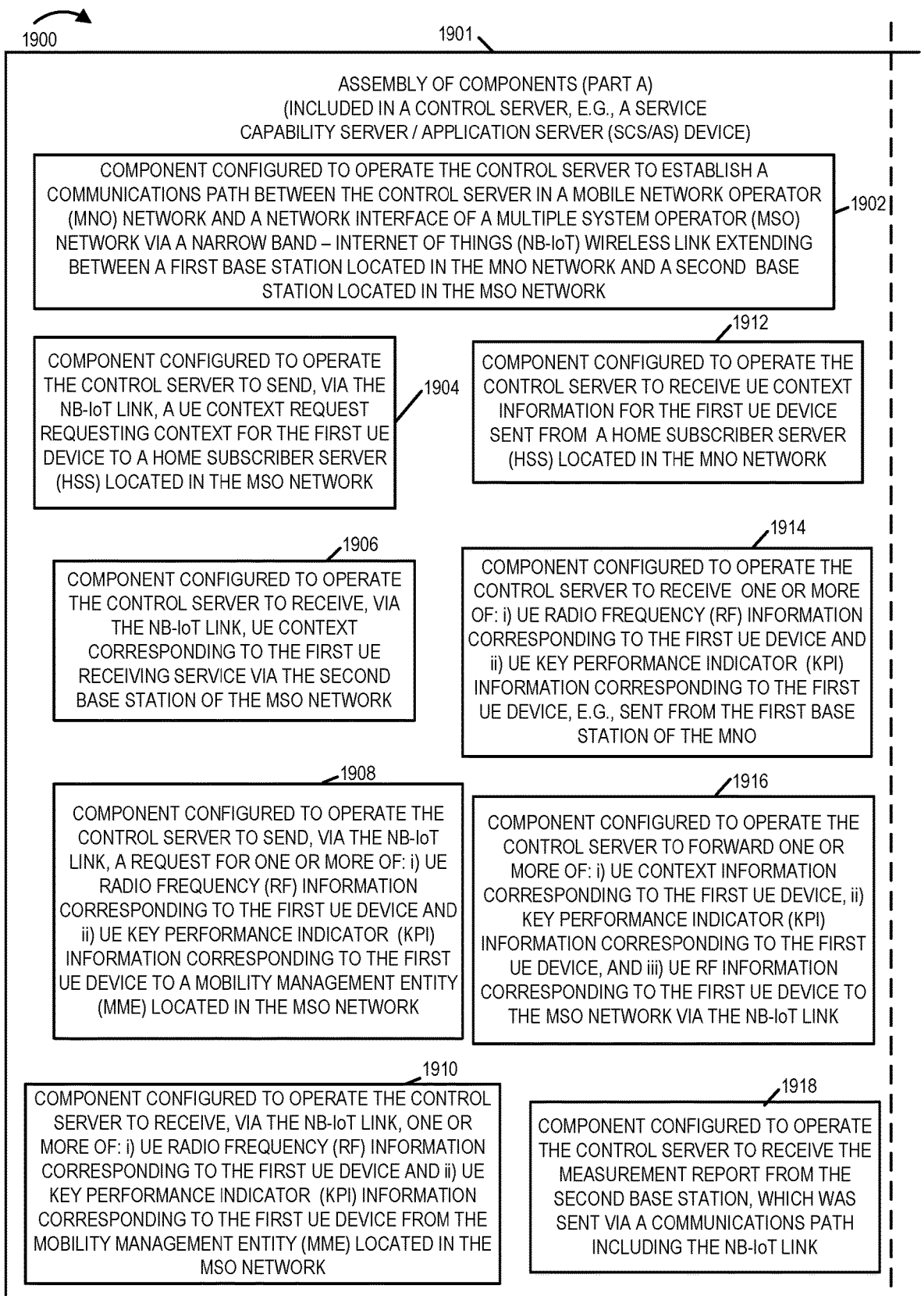
FIG. 14A is a first part of an exemplary assembly of components which may be including in a control server, e.g. SCS/AS of FIG. 8, in accordance with an exemplary embodiment.
Figures 14, 14B:
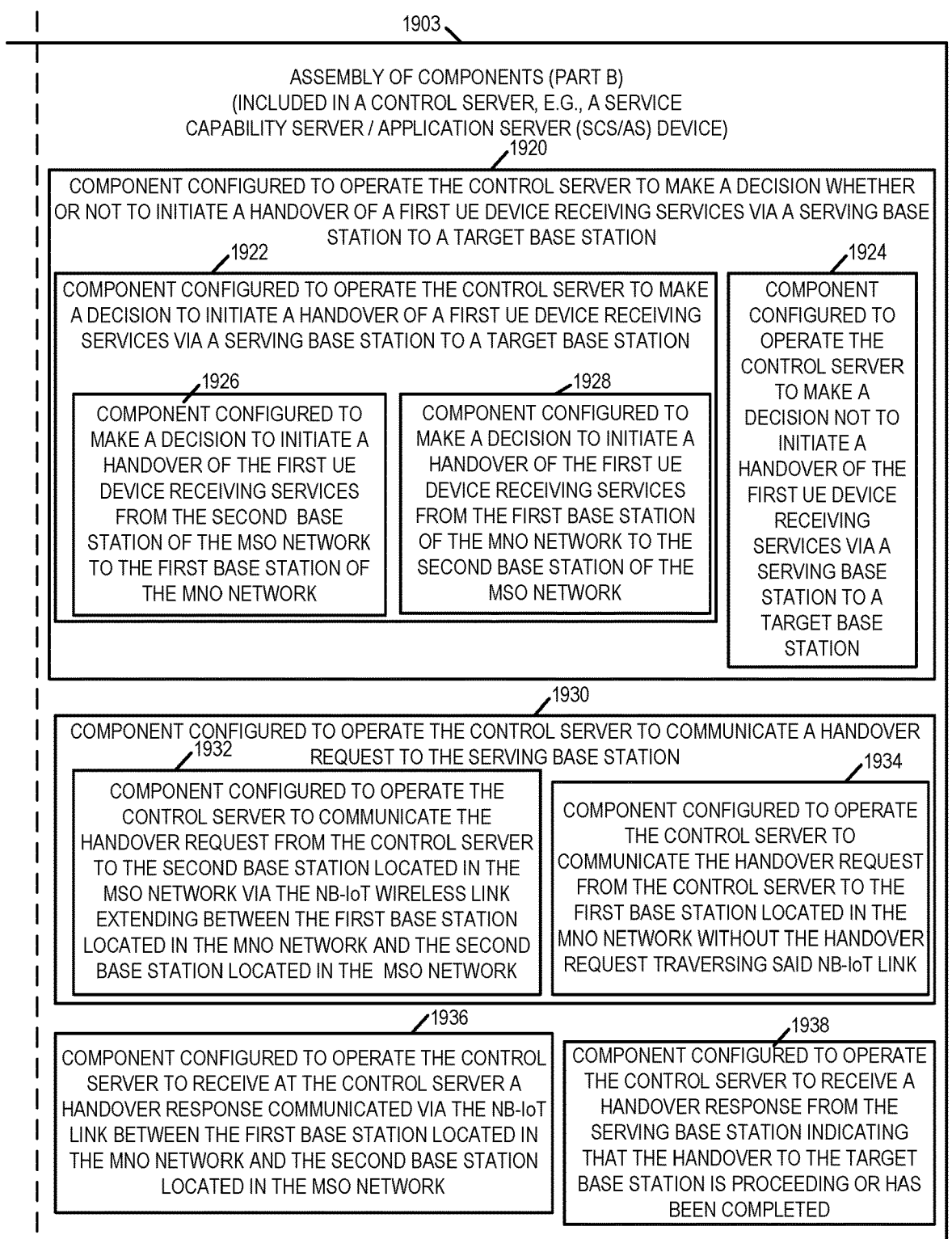
FIG. 14B is a second part of an exemplary assembly of components which may be including in a control server, e.g. SCS/AS of FIG. 8, in accordance with an exemplary embodiment.
FIG. 14 comprises the combination of FIG. 14A and FIG. 14B.

FIG. 14, comprising the combination of FIG. 14A and FIG. 14B, is a drawing of an exemplary assembly of components 1900, comprising the combination of Part A 1901 and Part B 1903, which may be included in an exemplary control server, e.g., SCS/AS server 800 of FIG. 8, SCS/AS 414 of FIGS. 4, 5, 6 and/or server 306 of FIG. 3, in accordance with an exemplary embodiment.

The components in the assembly of components 1900 can, and in some embodiments are, implemented fully in hardware within a processor, e.g., processor 1002, e.g., as individual circuits. The components in the assembly of components 1900 can, and in some embodiments are, implemented fully in hardware within the assembly of hardware components 1008, e.g., as individual circuits corresponding to the different components. In other embodiments some of the components are implemented, e.g., as circuits, within processor 1002 with other components being implemented, e.g., as circuits within assembly of components 1008, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1010 of the control server 1000, with the components controlling operation of control server 1000 to implement the functions corresponding to the components when the components are executed by a processor e.g., processor 1002. In some such embodiments, the assembly of components 1900 is included in the memory 1010 as assembly of software components 1030. In still other embodiments, various components in assembly of components 1900 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1900 is stored in the memory 1010, the memory 1010 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the control server 1000, e.g., a SCS/AS device, or elements therein such as the processor 1002, to perform the functions of corresponding steps illustrated and/or described in the method of one or more of the flowcharts, signaling diagrams and/or described with respect to any of the Figures. Thus the assembly of components 1900 includes various components that perform functions of corresponding one or more described and/or illustrated steps of an exemplary method.

Assembly of components 1900 includes a component 1902 configured to operate the control server to establish a communications path between the control server in a mobile network operator (MNO) network and a network interface of a multiple system operator (MSO) network via a narrow band-Internet of Things (NB-IoT) wireless link extending between a first base station located in the MNO network and a second base station located in the MSO network, a component 1904 configured to operate the control server to send, via the NB-IoT link, a UE context request requesting context fro the first UE device to a home subscriber server (HSS) located in the MSO network, a component 1906 configured to operate the control server to receive, via the NB-IoT link, UE context corresponding to the firs UE device receiving service via the second base station of the MSO network, a component 1908 configured to operate the control server to send, via the NB-IoT link, a request for one or more of: i) UE radio frequency (RF) information corresponding the first UE device and ii) UE key performance indicator (KPI) information corresponding to the first UE device to a mobility management entity (MME) located in the MSO network, and a component 1910 configured to operate the control server to receive, via the NB-IoT link, one or more of: i) UE radio frequency (RF) information corresponding the first UE device and ii) UE key performance indicator (KPI) information corresponding to the first UE device from the mobility management entity (MME) located in the MSO network.

Assembly of components 1900 further includes a component 1912 configured to operate the control server to receive UE context information for the first UE device sent from a home subscriber server (HSS) located in the MNO network, a component 1914 configured to operate the control server to receive one or more of i)) UE radio frequency (RF) information corresponding the first UE device and ii) UE key performance indicator (KPI) information corresponding to the first UE device, e.g., sent from the first base station of the MNO, a component 1918 configured to operate the control server to forward one or more of: i) UE context information corresponding to the first UE device and ii) key performance indicator (KPI) information corresponding to the first UE device, and iii) UE RF information corresponding to the first UE device to the MSO network via the NB-IoT link.

Assembly of components 1900 further includes a component 1920 configured to operate the control server to make a decision whether or not to initiate a handover of a first UE device receiving services via a serving base station to a target base station. Component 1920 includes a component 1922 configured to operate the control server to make a decision to initiate a handover of a first UE device receiving services from a serving base station to a target base station and a component 1924 configured to operate the control server to make a decision not to initiate a handover of a first UE device receiving services from a serving base station to a target base station. Component 1922 include a component 1926 configured to make a decision to initiate a handover of the first UE device receiving services from the second base station of the MSO network to the first base station of the MNO network and a component 1928 configured to make a decision to initiate a handover of the UE device receiving services from the from the first base station of the MNO network to the second base station of the MSO network.

Assembly of components 1900 further includes a component 1930 configured to operate the control server to communicate a handover request to the serving base station. Component 1930 includes a component 1932 configured to operate the control server to communicate the handover request form the control server to the second base station located in the MSO network via the NB-IoT communications link extending between the first base station located in the MNO network and the second base station located in the MSO network, and a component 1934 configured to operate the control server to communicate the handover request from the control server to first base station located in the MNO network without the handover request traversing the NB-IoT link. Assembly of components 1900 further includes a component 1936 configured to operate the control server to receive a handover response communicated via the NB-IoT link between the first base station locating the MNO network and the second base station location in the MSO network, and a component 1938 configured to operate the control server to receive a handover response from the serving base station indicating that the handover to the target base station is proceeding or has been completed.

FIG. 15 is a drawing of an exemplary assembly of components 2000 which may be included in an exemplary base station, e.g., a first cellular base station, e.g. a first cellular LTE base station, of an MNO network, in accordance with an exemplary embodiment, e.g., cellular base station 406 of FIGS. 4, 5 and 6 of MNO 402, cellular base station 324 of FIG. 2 of a MNO network and/or cellular base station 1400 of FIG. 10 included in an MNO network. The components in the assembly of components 2000 can, and in some embodiments are, implemented fully in hardware within a processor, e.g., processor 1402, e.g., as individual circuits. The components in the assembly of components 2000 can, and in some embodiments are, implemented fully in hardware within the assembly of hardware components 1008, e.g., as individual circuits corresponding to the different components. In other embodiments some of the components are implemented, e.g., as circuits, within processor 1402 with other components being implemented, e.g., as circuits within assembly of hardware components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1412 of the cellular base station 1400, with the components controlling operation of cellular base station 1400 to implement the functions corresponding to the components when the components are executed by a processor e.g., processor 1402. In some such embodiments, the assembly of components 2000 is included in the memory 1412 as assembly of software components 1416. In still other embodiments, various components in assembly of components 2000 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 2000 is stored in the memory 1412, the memory 1412 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the cellular base station 1400 or elements therein such as the processor 1402, to perform the functions of corresponding steps illustrated and/or described in the method of one or more of the flowcharts, signaling diagrams and/or described with respect to any of the Figures. Thus the assembly of components 2000 includes various components that perform functions of corresponding one or more described and/or illustrated steps of an exemplary method.

Assembly of components 2000 includes a component 2001 configured to operate the first base station, e.g., a cellular LTE base station in a MNO network, to establish and support a NB-IoT communication link between the first base station in a MNO network and a second base station, e.g., a cellular LTE base station in a MSO network, a component 2002 configured to establish a radio bearer channel between the first UE device and the first base station, and a component 2004 configured to operate the first base station to communicate data corresponding to a session in, which the first UE device is a participant, and which was handed off to the MNO network from the MSO network, via a cellular interface of the first base station.

FIG. 16 is a drawing of an exemplary assembly of components 2100 which may be included in an exemplary base station, e.g., a second cellular base station, e.g. a second cellular LTE base station, of an MSO network, in accordance with an exemplary embodiment, e.g., cellular base station 422 of FIGS. 4, 5 and 6 of MSO 404, cellular base station 326 of FIG. 2 of a MSO network and/or cellular base station 1400 of FIG. 10 included in an MSO network.

The components in the assembly of components 2100 can, and in some embodiments are, implemented fully in hardware within a processor, e.g., processor 1402, e.g., as individual circuits. The components in the assembly of components 2100 can, and in some embodiments are, implemented fully in hardware within the assembly of hardware components 1008, e.g., as individual circuits corresponding to the different components. In other embodiments some of the components are implemented, e.g., as circuits, within processor 1402 with other components being implemented, e.g., as circuits within assembly of hardware components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1412 of the cellular base station 1400, with the components controlling operation of cellular base station 1400 to implement the functions corresponding to the components when the components are executed by a processor e.g., processor 1402. In some such embodiments, the assembly of components 2100 is included in the memory 1412 as assembly of software components 1416. In still other embodiments, various components in assembly of components 2100 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 2000 is stored in the memory 1412, the memory 1412 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the cellular base station 1400 or elements therein such as the processor 1402, to perform the functions of corresponding steps illustrated and/or described in the method of one or more of the flowcharts, signaling diagrams and/or described with respect to any of the Figures. Thus the assembly of components 2100 includes various components that perform functions of corresponding one or more described and/or illustrated steps of an exemplary method.

Assembly of components 2100 includes a component 2101 configured to operate the second base station, e.g., a cellular LTE base station in a MSO network, to establish and support a NB-IoT communications link between a first base station, e.g., a cellular LTE base station in a MNO network and the second base station, a component 2103 configured to operate the second base station to establish and use a communication path with a control server, e.g, a SCS/AS, in the MNO network, said communications path including a NB-IoT wireless link between the first base station in the MNO network and the second base station in the MSO network, a component 2102 configured to operate the second base station to send, via the NB-IoT link, a first measurement report corresponding the first UE device, to the control server, a component 2104 configured to establish a radio bearer channel between the first UE device and the second base station and a component 2106 configured to operate the second base station to communicate data for a session in which the first UE device is a participant following the handover from the first base station of the MNO network to the second base station of the MSO network.

Figure 17:
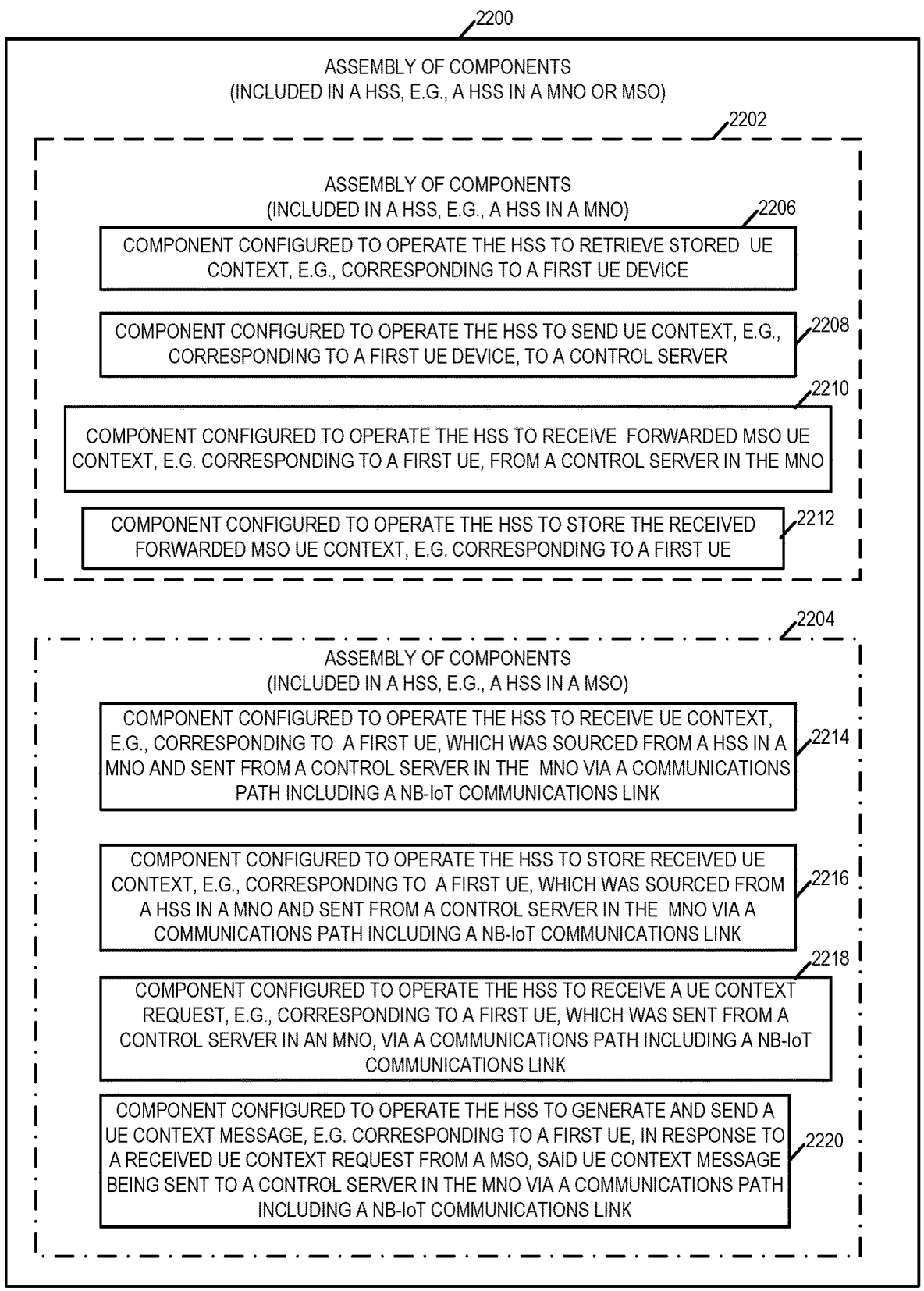
FIG. 17 is a drawing of an exemplary assembly of components which may be included in an exemplary home subscriber server (HSS) in accordance with an exemplary embodiment.

FIG. 17 is a drawing of an exemplary assembly of components 2200 which may be included in an exemplary home subscriber server (HSS), e.g., a HSS in a MNO network or a HSS in a MNO network, in accordance with an exemplary embodiment. Exemplary assembly of components 2200 which may be, and sometimes is, included in an exemplary home subscriber server (HSS), e.g. MNO HSS 220 of FIG. 2, MSO HSS 208 of FIG. 2, MNO HSS 314 of FIG. 3, HSS 1700 of FIG. 12, HSS 412 of MNO network 402 of FIGS. 4, 5 and 6, and/or HSS 428 of MSO network 404 of FIGS. 4, 5 and 6 in accordance with an exemplary embodiment.

The components in the assembly of components 2200 can, and in some embodiments are, implemented fully in hardware within a processor, e.g., processor 1702, e.g., as individual circuits. The components in the assembly of components 2200 can, and in some embodiments are, implemented fully in hardware within the assembly of hardware components 1708, e.g., as individual circuits corresponding to the different components. In other embodiments some of the components are implemented, e.g., as circuits, within processor 1702 with other components being implemented, e.g., as circuits within assembly of components 1708, external to and coupled to the processor 1702. As should be appreciated the level of integration of components on the processor and/or with some components being external to the processor may be one of design choice. Alternatively, rather than being implemented as circuits, all or some of the components may be implemented in software and stored in the memory 1710 of the HSS 1700, with the components controlling operation of HSS 1700 to implement the functions corresponding to the components when the components are executed by a processor e.g., processor 1702. In some such embodiments, the assembly of components 2200 is included in the memory 1710 as assembly of software components 1730. In still other embodiments, various components in assembly of components 2200 are implemented as a combination of hardware and software, e.g., with another circuit external to the processor providing input to the processor which then under software control operates to perform a portion of a component's function. When implemented in software the components include code, which when executed by a processor, e.g., processor 1702, configure the processor to implement the function corresponding to the component. In embodiments where the assembly of components 2200 is stored in the memory 1710, the memory 1710 is a computer program product comprising a computer readable medium comprising code, e.g., individual code for each component, for causing at least one computer, e.g., processor 1702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the HSS 1700 or elements therein such as the processor 1702, to perform the functions of corresponding steps illustrated and/or described in the method of one or more of the flowcharts, signaling diagrams and/or described with respect to any of the Figures. Thus the assembly of components 2200 includes various components that perform functions of corresponding one or more described and/or illustrated steps of an exemplary method.

Assembly of components 2200 includes one or both of: assembly of components 2202 included in a HSS, e.g., a HSS in a MNO network and assembly of components 2204 included in a HSS, e.g., a HSS in a MSO network. Assembly of components 2202 includes a components 2206 configured to operate the HSS to retrieve stored UE context, e.g. corresponding to a first UE device, a component 2208 configured to operate the HSS to sent the UE context, e.g., corresponding to the first UE device, to a control server, e.g. a SCS/AS, in the MNO network, a component 2210 configured to operate the HSS to receive forwarded MSO UE context, e.g. corresponding to a first UE device, from a control server, e.g., SCS/AS, in the MNO, and a component 2212 configured to operate the HSS to store the retrieved forwarded MSO context, e.g., corresponding to the first UE device. Assembly of components 2204 includes a components 2214 configured to operate the HSS to receive UE context, e.g. corresponding to a first UE device, which was sourced from a HSS in the MNO network and sent from a control server in the MNO network via a communications path including an NB-IoT communications link, a component 2216 configured to operate the HSS to store the received UE context, e.g. corresponding to a first UE device, which was sourced from a HSS in the MNO network and sent from a control server in the MNO network via a communications path including an NB-IoT communications link, a component 2218 configured to operate the HSS to receive a UE context request, e.g. corresponding to a first UE device, which was sent from a control server in a MNO network via a communications path including a NB-IoT communications link, and a component 2220 configure to operate the HSS to generate and send a UE context message, e.g., corresponding to a first UE device, in response to a received UE context request from a MSO network, said UE context message being sent to a control server in the MNO network via a communications path in a NB-IoT communications link.

Figure 18:
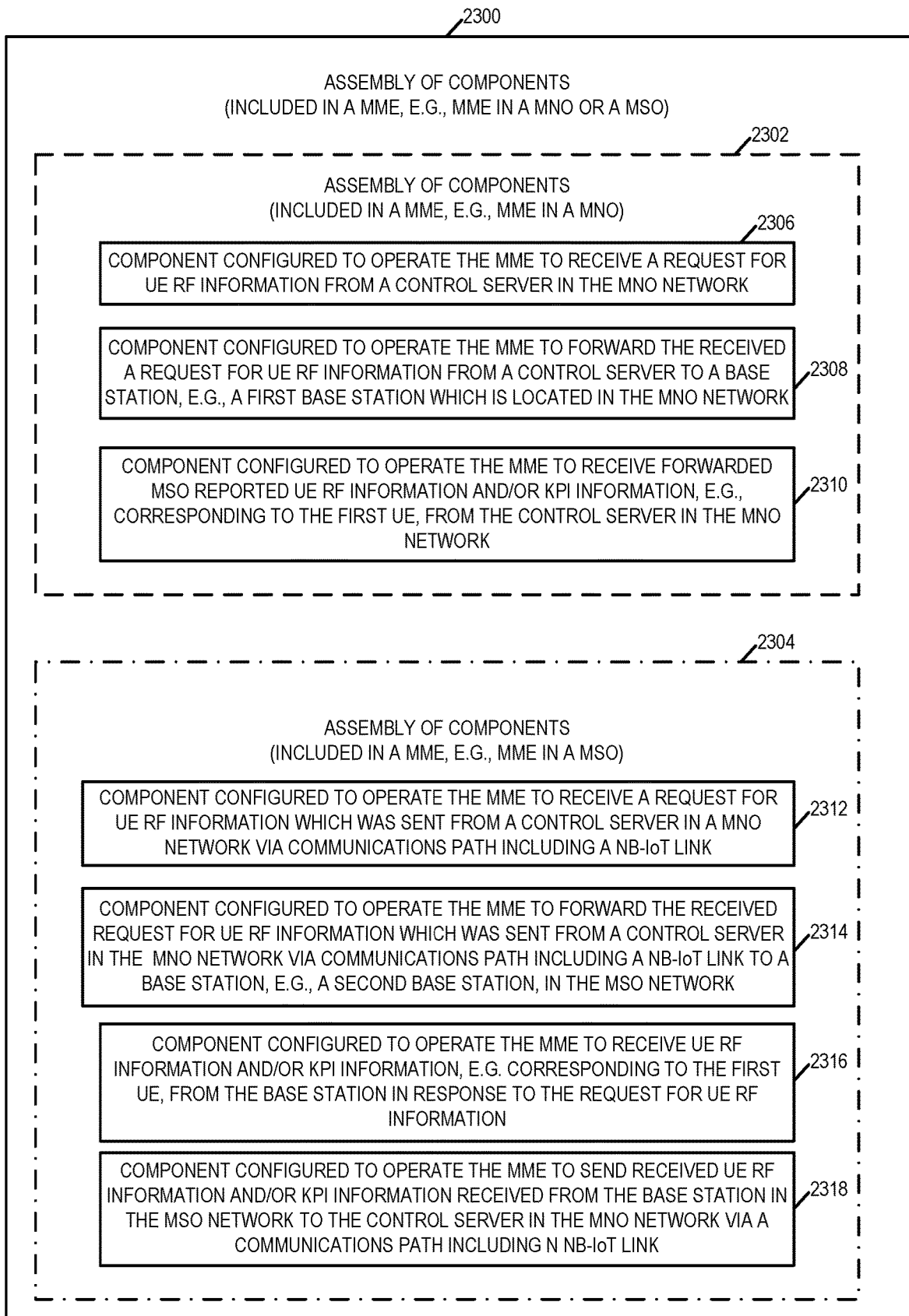
FIG. 18 is a drawing of an exemplary assembly of components which may be included in an exemplary mobility management entity (MME) device in accordance with an exemplary embodiment.

FIG. 18 is a drawing of an exemplary assembly of components 2300 which may be included in an exemplary mobility management entity (MME) device, e.g., a MME in a MNO network or a MME in a MSO network, in accordance with an exemplary embodiment. Exemplary assembly of components 2300 which may be, and sometimes is, included in an exemplary mobility management entity (MME), e.g. MNO MME 222 of FIG. 2, MSO MME 210 of FIG. 2, MNO MME 316 of FIG. 3, MME 1200 of FIG. 9, MME 408 of MNO network 402 of FIGS. 4, 5 and 6, and/or MME 424 of MSO network 404 of FIGS. 4, 5 and 6 in accordance with an exemplary embodiment.

The components in the assembly of components 2300 can, and in some embodiments are, implemented fully in hardware within a processor, e.g., processor 1202, e.g., as individual circuits. The components in the assembly of components 2300 can, and in some embodiments are, implemented fully in hardware within the assembly of hardware components 1208, e.g., as individual circuits corresponding to the different components. In other embodiments some of the components are implemented, e.g., as circuits, within processor 1202 with other components being implemented, e.g., as circuits within assembly of components 1208, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1210 of the MME 1200, with the components controlling operation of MME 1200 to implement the functions corresponding to the components when the components are executed by a processor e.g., processor 1202. In some such embodiments, the assembly of components 2300 is included in the memory 1210 as assembly of software components 1230. In still other embodiments, various components in assembly of components 2300 are implemented as a combination of hardware and software, e.g., with another circuit external to the processor providing input to the processor which then under software control operates to perform a portion of a component's function. When implemented in software the components include code, which when executed by a processor, e.g., processor 1202, configure the processor to implement the function corresponding to the component. In embodiments where the assembly of components 2300 is stored in the memory 1210, the memory 1210 is a computer program product comprising a computer readable medium comprising code, e.g., individual code for each component, for causing at least one computer, e.g., processor 1202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 18 control and/or configure the MME 1200 or elements therein such as the processor 1202, to perform the functions of corresponding steps illustrated and/or described in the method of one or more of the flowcharts, signaling diagrams and/or described with respect to any of the Figures. Thus the assembly of components 2300 includes various components that perform functions of corresponding one or more described and/or illustrated steps of an exemplary method.

Assembly of components 2300 includes one or both of: assembly of components 2302 included in a MME, e.g., a MME in a MNO network and assembly of components 2304 included in a MME, e.g., a MME in a MSO network. Assembly of components 2302 includes a component 2306 configured to operate the MME to receive a request for UE RF information from a control server in the MNO, a component 2308 configured to operate the MME to forward the received request from UE RF information from a control server to a base station, e.g., a first cellular base station which is located in the MNO, and a component 2310 configured to operate the MME to receive forwarded MSO network reported UE RF information and/or KPI information, e.g., corresponding to a first UE device, from the control server in the MNO. Assembly of components 2304 includes a component 2312 configured to operate the MME to receive a request for UE RF information which was sent from a control server in a MNO via a communications path including a NB-IoT communications link, a component 2314 configured to operate the MME to forward the received request for UE RF information which was sent from a control server in a MNO network via a communications path including a NB-IoT communications link to a base station, e.g. a second base station in the MSO network, a component 2316 configured to operate the MME to received UE RF information and/or KPI information, e.g., corresponding to a first UE device, from the base station in response to the request for UE RF information, and a component 2318 configured to operate the MME to send received UE RF information and/or KPI information received from the base station in the MSO network to the control server in the MNO network via communications path including a NB-IoT communications link.

For purposes of various exemplary numbered embodiments, the cellular base station 406 of the MNO network 402 will be referred to as a first base station and the base station 422 of the MSO network will be referred to as a second base station. It should be appreciated that the MNO and MSO networks may each include one or more base stations and each network will often include multiple base stations. Accordingly the reference to first and second base stations is for identification purposes when discussing the exemplary embodiments and is not intended to imply a particular total number of base stations in either of the MNO or MSO networks. In various embodiments the base stations 422 and 406 are cellular base stations, e.g., LTE base stations in an embodiment where the MNO and MSO include LTE communications networks. It should be appreciated that depending on which base station (406 or 422) is being used as the serving base station to support a communications session in which a UE device, e.g., a first UE device such as UE 436 is a participant, the handoff may be from the MNO network to the MSO network or alternatively from the MSO network to the MNO network. FIG. 5 shows an example where the base station 406 in the MNO network 402 is initially acting as the serving base station and the base station 422 in the MSO is the target base station to which the handoff is implemented. FIG. 6 shows an example where the base station 422 in the MSO network 404 is initially acting as the serving base station and the base station 406 in the MNO network 402 is the target base station to which the handoff is implemented. It should be appreciated that handoffs between the MNO and MSO base stations may occur multiple times depending on network conditions. Accordingly, in some cases where there are multiple handovers between the networks for a communications session corresponding to an individual UE device, e.g., UE 436, the method shown in FIG. 5 is implemented followed by the method shown in FIG. 6. In other embodiments the method in FIG. 6 is followed by the method of FIG. 5 with handoff methods being implemented as desirable based on changing network conditions and/or UE device location. It should be appreciated that once NB-IoT link 438 is established in step 502 or 602 it can be used for subsequent handoffs. Accordingly, when implemented in sequence, step 502 or 602 may be optional in the case where the NB-IoT communications link between base stations 406 and 422 has already been established as part of implementing an earlier handoff or for other reasons.

Numbered List of Exemplary Method Embodiments

Method Embodiment 1 A communications method, comprising: establishing (602 or 502 or 804) a communications path (604 or 504) between a control server (414) (e.g., a services capabilities server and/or application server) in a mobile network operator (MNO) network (402) and a network interface (430) of a multiple system operator (MSO) network (404) via NB-IoT wireless link (438) extending between a first base station (406) located in the MNO network (402) and a second base station (422) located in the MSO network (404); making, at the control server (414), a decision (695 or 559 or 828) to initiate a handover of a first UE device (436) receiving services via a serving base station (406 or 422) to a target base station (406 or 422); and communicating (560 or 695 or 836) a handover request (562 or 698) to the serving base station (406 or 422).

Various numbered Method Embodiments such as Method Embodiments 2-13 are supported by FIG. 6 which discusses MSO to MNO handoff.

Method Embodiment 2 The method of Method Embodiment 1, wherein the serving base station is the second base station (422) of the MSO network (404) and the target base station is the first base station (406) of the MNO network (402).

Method Embodiment 3 The method of Method Embodiment 2, wherein communicating (560 or 696 or 836) a handover request (562 or 698) to the serving base station includes communicating (696 or 838) the handover request (698) from the control server (414) to the second base station (422) located in the MSO network (404) via the NB-IoT wireless link (438) extending between the first base station (406) located in the MNO network (403) and a second base station (422) located in the MSO network (404).

Method Embodiment 4 The method of Method Embodiment 3, further comprising: operating the control server (414), prior to making the decision (695 or 832) to initiate the handover of a UE device (436) to the first base station (406) in the MNO network (402), to send (606 or 806), via the NB-IoT link (438), a UE context request (608) requesting context for the first UE device (436), to a home subscriber server (428) located in the MSO network (404).

Method Embodiment 5 The method of Method Embodiment 3, further comprising: operating the control server (414), prior to making the decision (695 or 832) to initiate the handover of a UE device (436) to the first base station (406) in the MNO network (402), to receive (632 or 808), via the NB-IoT link (438), UE context (622) corresponding to the first UE receiving service via the second base station (422) of the MSO network (404).

Method Embodiment 6 The method of Method Embodiment 5, further comprising: operating the control server (414), prior to making the decision (695 or 832) to initiate the handover of a UE device (436) to the first base station (406) in the MNO network (402), to send (606 or 810), via the NB-IoT link (438), a request (640) for one or more of i) UE radio frequency (RF) information corresponding to the first UE device (436) and ii) UE key performance indicator (KPI) information corresponding to the first UE device (436), to a mobility management entity (MME) (424) located in the MSO network (404).

Method Embodiment 7 The method of Method Embodiment 6, further comprising: operating the control server (414), prior to making the decision (695 or 832) to initiate the handover of the first UE device (436) to the first base station (406) in the MNO network (402), to receive (672 or 812), via the NB-IoT link (438), one or more of i) UE radio frequency (RF) information corresponding to the first UE device (436) and ii) UE key performance indicator (KPI) information corresponding to the first UE device (436), from the mobility management entity (MME) (424) located in the MNO network (404)

Method Embodiment 8 The method of Method Embodiment 3, further comprising: receiving (714 or 842), at the control server (414) a handover response (708) communicated via the NB-IoT link (438) between the first base station (406) located in the MNO network (402) and the second cellular base station (422) located in the MSO network (404).

Method Embodiment 9 The method of Method Embodiment 8, further comprising: operating the first base station (406) to communicate (718 or 846) data corresponding to a session in which the first UE (436) is a participant, and which was handed off to the MNO network (402) from the MSO network (404), via a cellular interface (418) of the first base station (406).

Method Embodiment 10 The method of Method Embodiment 9, further comprising: prior to operating the first base station (406) to communicate (718 or 846) data corresponding to a session in which the first UE device (436) is a participant, and which was handed off to the MNO network (402) from the MSO network (404), establishing (692 or 844) a radio bearer channel between the first UE device (436) and the first cellular base station (406).

Method Embodiment 11 The method of Method Embodiment 10, wherein said first base station (406) of the MNO network (402) and the second base station (422) of the MSO network (404) are both cellular base stations.

Method Embodiment 12 The method of Method Embodiment 11, wherein the first base station (406) and the second base station (422) are both LTE base stations.

Method Embodiment 13 The method of Method Embodiment 12, wherein the first base station is part of a LTE network included in the MNO network; and wherein the second base station is part of a LTE network included in the MSO network.

Various numbered Method Embodiments, such as Method Embodiment 14-22, relate to a handover from a MNO network to a MSO network such as shown in FIG. 5.

Method Embodiment 14 The method of Method Embodiment 1, wherein the serving base station is the first base station (406) of the MNO network (402) and the target base station is the second base station (422) of the MSO network (404).

Method Embodiment 15 The method of Method Embodiment 14, wherein communicating (560 or 836) a handover request (562) to the serving base station (406) includes: sending (560 or 840) the handover request (562) from the control server (414) to the first base station (406) without the handover request (562) traversing said NB-IoT link (438).

Method Embodiment 16 The method of Method Embodiment 14, further comprising: operating the control server (414) to forward (530 or 818) one or more of i) UE context information corresponding to the first UE device (436) and ii) key performance indicator (KPI) information corresponding to the first UE device (436) to the MSO network (404) via the NB-IoT link (438). (UE context information corresponding to the first UE device (436) is forwarded to a home subscriber server (428) in MSO network (404) via the NB-IoT link (438). (KPI information and/or RF information corresponding to the first UE is forwarded to the second base station (422) in the MSO network (404) via the NB-IoT link (438).) (In some embodiments, KPI information and/or RF information corresponding to the first UE is forwarded to the MME (424) in the MSO network (404) via the NB-IoT link (438), and then sent from the MME (424) to the second base station (422) in the MSO network (404).)

Method Embodiment 17 The method of Method Embodiment 16, further comprising: sending (540 or 820) a measurement report corresponding to the first UE (536) from the second cellular base station (422) to the control server (414) prior to the control server (414) making said handoff decision (559).

Method Embodiment 18 The method of Method Embodiment 16, further comprising: operating the control server (414) to receive (570) a handover response (568) from the serving base station (406) indicating that the handover to the target base station (422) is proceeding or has been completed.

Method Embodiment 19 The method of Method Embodiment 18, further comprising: operating the second base station (422) to communicate (578 or 852) data for a session in which the first UE device (436) is a participant following the handover from the first base station (406) of the MNO network (402) to the second base station (422) of the MSO network (404).

Method Embodiment 20 The method of Method Embodiment 19, wherein said first base station (406) of the MNO network (402) and the second base station (422) of the MSO network (404) are both cellular base stations.

Method Embodiment 21 The method of Method Embodiment 20, wherein the first base station (406) and the second base station (422) are both LTE base stations.

Method Embodiment 22 The method of Method Embodiment 21, wherein the first base station is part of a LTE network included in the MNO network; and wherein the second base station is part of a LTE network included in the MSO network.

Numbered List of Exemplary System Embodiments

System Embodiment 1 A communications system (400) comprising: a mobile network operator (MNO) network (402) including: a control server (414 or 1000); and a first base station (406 or 1400); and wherein said control server (414 or 1000) includes a first processor (1002) configured to: operate the control server to establish (602 or 502 or 804) a communications path (604 or 504) between the control server (414) (e.g., a services capabilities server and/or application server) in the mobile network operator (MNO) network (402) and a network interface (430) of a multiple system operator (MSO) network (404) via NB-IoT wireless link (438) extending between the first base station (406) located in the MNO network (402) and a second base station (422) located in the MSO network (404); operate the control server (414) to make a decision (695 or 559 or 828) to initiate a handover of a first UE device (436) receiving services via a serving base station (406 or 422) to a target base station (406 or 422); and operate the control server (414) to communicate (560 or 695 or 836) a handover request (562 or 698) to the serving base station (406 or 422).

System Embodiment 2 The communications system (400) of System Embodiment 1, wherein the serving base station is the second base station (422) of the MSO network (404) and the target base station is the first base station (406) of the MNO network (402).

System Embodiment 3 The communications system (400) of System Embodiment 2, wherein said first processor (1002) is configured to: operate the control server (414) to communicate (696 or 838) the handover request (698) from the control server (414) to the second base station (422) located in the MSO network (404) via the NB-IoT wireless link (438) extending between the first base station (406) located in the MNO network (403) and a second base station (422) located in the MSO network (404), as part of being configured to operate the control server to communicate (560 or 696 or 836) a handover request (562 or 698) to the serving base station includes System Embodiment 4 The communications system (400) of System Embodiment 3, wherein said first processor (1002) is further configured to: operate the control server (414), prior to making the decision (695 or 832) to initiate the handover of a UE device (436) to the first base station (406) in the MNO network (402), to send (606 or 806), via the NB-IoT link (438), a UE context request (608) requesting context for the first UE device (436), to a home subscriber server (428) located in the MSO network (404).

System Embodiment 5 The communications system (400) of System Embodiment 3, wherein said first processor (1002) is further configured to: operate the control server (414), prior to making the decision (695 or 832) to initiate the handover of a UE device (436) to the first base station (406) in the MNO network (402), to receive (632 or 808), via the NB-IoT link (438), UE context (622) corresponding to the first UE receiving service via the second base station (422) of the MSO network (404).

System Embodiment 6 The communications system (400) of System Embodiment 5, wherein said first processor (1002) is further configured to: operate the control server (414), prior to making the decision (695 or 832) to initiate the handover of a UE device (436) to the first base station (406) in the MNO network (402), to send (606 or 810), via the NB-IoT link 438, a request (640) for one or more of i) UE radio frequency (RF) information corresponding to the first UE device (436) and ii) UE key performance indicator (KPI) information corresponding to the first UE device (436), to a mobility management entity (MME) (424) located in the MSO network (404).

System Embodiment 7 The communications system (400) of System Embodiment 6, wherein said first processor (1002) is further configured to: operate the control server (414), prior to making the decision (695 or 832) to initiate the handover of the first UE device (436) to the first base station (406) in the MNO network (402), to receive (672 or 812), via the NB-IoT link (438), one or more of i) UE radio frequency (RF) information corresponding to the first UE device (436) and ii) UE key performance indicator (KPI)

information corresponding to the first UE device (436), from the mobility management entity (MME) (424) located in the MNO network (404)

System Embodiment 8 The communications system of System Embodiment 3, wherein said first processor (1002) is further configured to: operate the control server (414) to receive (714 or 842) a handover response (708) communicated via the NB-IoT link (438) between the first base station (406) located in the MNO network (402) and the second base station (422) located in the MSO network (404).

System Embodiment 9 The communications system (400) of System Embodiment 8, wherein said first base station (406 or 1400) includes a second processor (1402), and wherein said second processor (1402) is configured to: operate the first base station (406) to communicate (718 or 846) data corresponding to a session in which the first UE (436) is a participant, and which was handed off to the MNO network (402) from the MSO network (404), via a cellular interface (418) of the first base station (406).

System Embodiment 10 The communications system (400) of System Embodiment 9, wherein said second processor (1402) is further configured to: operate the first base station (406) to establish (692 or 844) a radio bearer channel between the first UE device (436) and the first cellular base station (406), said establishing being prior to operating the first base station (406) to communicate (718 or 846) data corresponding to a session in which the first UE device (436) is a participant, and which was handed off to the MNO network (402) from the MSO network (404).

System Embodiment 11 The communications system (400) of System Embodiment 10, wherein said first base station (406) of the MNO network (402) and the second base station (422) of the MSO network (404) are both cellular base stations.

System Embodiment 12 The communications system (400) of System Embodiment 11, wherein the first base station (406) and the second base station (422) are both LTE base stations.

System Embodiment 13 The communications system (400) of System Embodiment 12, wherein the first base station (406) is part of a LTE network included in the MNO network (402); and wherein the second base station (422) is part of a LTE network included in the MSO network (404).

Various System Embodiments such as System Embodiments 14-22 cover a handover from a MNO network to the MSO network as shown in FIG. 5.

System Embodiment 14 The communications system of System Embodiment 1, wherein the serving base station is the first base station (406) of the MNO network (402) and the target base station is the second base station (422) of the MSO network (404).

System Embodiment 15 The communications system (400) of System Embodiment 14, wherein said first processor (1002) is configured to: operate the control server (414) to send (560 or 840) the handover request (562) from the control server (414) to the first base station (406) without the handover request (562) traversing said NB-IoT link (438), as part of being configured to operate the control server (414) to communicate (560 or 836) a handover request (562) to the serving base station (406).

System Embodiment 16 The communications system (400) of System Embodiment 14, wherein said first processor (1002) is further configured to: operate the control server (414) to forward (530 or 818) one or more of i) UE context information corresponding to the first UE device (436) and ii) key performance indicator (KPI) information corresponding to the first UE device (436) to the MSO network (404) via the NB-IoT link (438). (UE context information corresponding to the first UE device (436) is forwarded to a home subscriber server (428) in MSO network (404) via the NB-IoT link (438). (KPI information and/or RF information corresponding to the first UE is forwarded to the second base station (422) in the MSO network (404) via the NB-IoT link (438).) (In some embodiments, KPI information and/or RF information corresponding to the first UE is forwarded to the MME (424) in the MSO network (404) via the NB-IoT link (438), and then sent from the MME (424) to the second base station (422) in the MSO network (404).)

System Embodiment 17 The communications system (400) of System Embodiment 16, further comprising: said multiple system operator (MSO) network (404) including said second base station (422 or 1400), said second base station (422 or 1400) including a second processor (1402); and wherein said second processor (1402) is configured to: operate the second base station (422) to send (540 or 820) a measurement report corresponding to the first UE (536) from the second base station (422) to the control server (414) prior to the control server (414) making said handoff decision (559).

System Embodiment 18 The communications system (400) of System Embodiment 16, wherein said first processor (1002) is configured to: operate the control server (414) to receive (570) a handover response (568) from the serving base station (406) indicating that the handover to the target base station (422) is proceeding or has been completed.

System Embodiment 19 The communications system (400) of System Embodiment 18, wherein said second processor (1402) is further configured to: operate the second base station (422) to communicate (578 or 852) data for a session in which the first UE device (436) is a participant following the handover from the first base station (406) of the MNO network (402) to the second base station (422) of the MSO network (404).

System Embodiment 20 The communications system (400) of System Embodiment 19, wherein said first base station (406) of the MNO network (402) and the second base station (422) of the MSO network (404) are both cellular base stations.

System Embodiment 21 The communications system (400) of System Embodiment 20, wherein the first base station (406) and the second base station (422) are both LTE base stations.

System Embodiment 22 The communications system (400) of System Embodiment 21, wherein the first base station (406) is part of a LTE network included in the MNO network (402); and wherein the second base station (422) is part of a LTE network included in the MSO network (402).

Numbered List of Exemplary Computer Readable Medium Embodiments

Non-Transitory Computer Readable Medium Embodiment 1 A non-transitory computer readable medium including computer executable instructions which when executed by a processor of a control server cause the control server to perform the steps of: establishing (602 or 502 or 804) a communications path (604 or 504) between the control server (414) (e.g., a services capabilities server and/or application server) in a mobile network operator (MNO) network (402) and a network interface (430) of a multiple system operator (MSO) network (404) via NB-IoT wireless link (438) extending between a first base station (406) located in the MNO network (402) and a second base station (422) located in the MSO network (404); making, at the control server (414), a decision (695 or 559 or 828) to initiate a handover of a first UE device (436) receiving services via a serving base station (406 or 422) to a target base station (406 or 422); and communicating (560 or 695 or 836) a handover request (562 or 698) to the serving base station (406 or 422).

Various embodiments are directed to apparatus, e.g., service capabilities exposure function (SCEF) devices, control servers, service capability servers (SCSs), application server (ASs), SCS/AS devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, cable systems, non-cellular networks, cellular networks, multiple system operator (MSO) networks, mobile network operator (MNO) networks, LTE networks, service management systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating control servers, service capabilities exposure function (SCEF) devices, service capability server (SCSs), application server (ASs), SCS/AS devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to methods, e.g., method of controlling and/or operating a communications system including a MNO network including a plurality of cellular base stations, a MSO network including a plurality of cellular base station, a NB-IoT communications link between a cellular base station of the MNO network and a cellular base station of the MSO network and control server, e.g. a SCS/AS included in the MNO network. Various embodiments are also directed to methods, e.g., method of controlling and/or operating a control device, a service management device or a service management system. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a control server, a service capabilities exposure function (SCEF) device, a service capability server (SCS), application server (AS), SCS/AS device, user device such as a user equipment (UE) device, base stations, e.g. a cellular base station in a MNO network supporting NB-IoT (macro cell base station or small cell base station) such as a eNB or gNB or ng-eNB, a cellular base station in a MSO network supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server, a service capabilities exposure function (SCEF) device, a service capability server (SCS), application server (AS), SCS/AS device, user device such as a user equipment (UE) device, base stations, e.g. a cellular base station in a MNO supporting NB-IoT (macro cell base station or small cell base station) such as a eNB or gNB or ng-eNB, a cellular base station in a MSO supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server, a service capabilities exposure function (SCEF) device, a service capability server (SCS), application server (AS), SCS/AS device, user device such as a user equipment (UE) device, base stations, e.g. cellular base station in a MNO supporting NB-IoT (macro cell base station or small cell base station) such as a eNB or gNB or ng-eNB, cellular base station in a MNO supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a control server, a service capabilities exposure function (SCEF) device, a service capability server (SCS), application server (AS), SCS/AS device, user device such as a user equipment (UE) device, base stations, e.g. cellular base station in a MNO supporting NB-IoT (macro cell base station or small cell base station) such as a eNB or gNB or ng-eNB, cellular base station in a MSO supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a control server, a service capabilities exposure function (SCEF) device, a service capability server (SCS), application server (AS), SCS/AS device, user device such as a user equipment (UE) device, base stations, e.g. a cellular base station in a MNO supporting NB-IoT (macro cell base station or small cell base station) such as a eNB or gNB or ng-eNB, a cellular base station in a MSO supporting NB-IoT (macro cell base station or small cell base station) such as a eNB or gNB or ng-eNB non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, comprising:
   establishing a communications path between a control server in a mobile network operator (MNO) network and a network interface of a multiple system operator (MSO) network via a Narrow Band-Internet of Things (NB-IoT) wireless link extending between a first base station located in the MNO network and a second base station located in the MSO network;
   making, at the control server, a decision to initiate a handover of a first UE device receiving services via a serving base station to a target base station; and
   communicating a handover request to the serving base station.

2. The method of claim 1, wherein the serving base station is the second base station of the MSO network and the target base station is the first base station of the MNO network.

3. The method of claim 2, wherein communicating a handover request to the serving base station includes communicating the handover request from the control server to the second base station located in the MSO network via the NB-IoT wireless link extending between the first base station located in the MNO network and the second base station located in the MSO network.

4. The method of claim 3, further comprising:
   operating the control server, prior to making the decision to initiate the handover of the first UE device to the first base station in the MNO network, to send, via the NB-IoT link, a UE context request requesting context for the first UE device, to a home subscriber server located in the MSO network.

5. The method of claim 3, further comprising:
   operating the control server, prior to making the decision to initiate the handover of the first UE device to the first base station in the MNO network, to receive, via the NB-IoT link, UE context corresponding to the first UE device receiving service via the second base station of the MSO network.

6. The method of claim 5, further comprising:
   operating the control server, prior to making the decision to initiate the handover of the first UE device to the first base station in the MNO network, to send, via the NB-IoT link, a request for one or more of: i) UE radio frequency (RF) information corresponding to the first UE device and ii) UE key performance indicator (KPI) information corresponding to the first UE device, to a mobility management entity (MME) located in the MSO network.

7. The method of claim 3, further comprising:
receiving, at the control server, a handover response communicated via the NB-IoT link between the first base station located in the MNO network and the second base station located in the MSO network.

8. The method of claim 7, further comprising:
operating the first base station to communicate data corresponding to a session in which the first UE device is a participant, and which was handed off to the MNO network from the MSO network, via a cellular interface of the first base station.

9. The method of claim 1, wherein the serving base station is the first base station of the MNO network and the target base station is the second base station of the MSO network.

10. The method of claim 9, further comprising:
operating the control server to forward one or more of i) UE context information corresponding to the first UE device and ii) key performance indicator (KPI) information corresponding to the first UE device to the MSO network via the NB-IoT link.

11. The method of claim 10, further comprising:
sending a measurement report corresponding to the first UE device from the second base station to the control server prior to the control server making said handoff decision.

12. The method of claim 10, further comprising:
operating the control server to receive a handover response from the serving base station indicating that the handover to the target base station is proceeding or has been completed.

13. The method of claim 12, further comprising:
operating the second base station to communicate data for a session in which the first UE device is a participant following the handover from the first base station of the MNO network to the second base station of the MSO network.

14. A communications system comprising:
a mobile network operator (MNO) network including:
  a control server; and
  a first base station; and
  wherein said control server includes a first processor configured to:
    operate the control server to establish a communications path between the control server in the mobile network operator (MNO) network and a network interface of a multiple system operator (MSO) network via a Narrow Band-Internet of Things (NB-IoT) wireless link extending between the first base station located in the MNO network and a second base station located in the MSO network;
    operate the control server to make a decision to initiate a handover of a first UE device receiving services via a serving base station to a target base station; and
    operate the control server to communicate a handover request to the serving base station.

15. The communications system of claim 14, wherein the serving base station is the second base station of the MSO network and the target base station is the first base station of the MNO network.

16. The communications system of claim 15, wherein said first processor is configured to:
operate the control server to communicate the handover request from the control server to the second base station located in the MSO network via the NB-IoT wireless link extending between the first base station located in the MNO network and the second base station located in the MSO network, as part of being configured to operate the control server to communicate a handover request to the serving base station.

17. The communications system of claim 16, wherein said first processor is further configured to:
operate the control server, prior to making the decision to initiate the handover of the first UE device to the first base station in the MNO network, to send, via the NB-IoT link, a UE context request requesting context for the first UE device, to a home subscriber server located in the MSO network.

18. The communications system of claim 16, wherein said first processor is further configured to:
operate the control server, prior to making the decision to initiate the handover of the first UE device to the first base station in the MNO network, to receive, via the NB-IoT link, UE context corresponding to the first UE device receiving service via the second base station of the MSO network.

19. The communications system of claim 18, wherein said first processor is further configured to:
operate the control server, prior to making the decision to initiate the handover of the first UE device to the first base station in the MNO network, to send, via the NB-IoT link, a request for one or more of: i) UE radio frequency (RF) information corresponding to the first UE device and ii) UE key performance indicator (KPI) information corresponding to the first UE device, to a mobility management entity (MME) located in the MSO network.

20. A non-transitory computer readable medium including computer executable instructions which when executed by a processor of a control server cause the control server to perform the steps of:
establishing a communications path between the control server in a mobile network operator (MNO) network and a network interface of a multiple system operator (MSO) network via a Narrow Band-Internet of Things (NB-IoT) wireless link extending between a first base station located in the MNO network and a second base station located in the MSO network;
making, at the control server, a decision to initiate a handover of a first UE device receiving services via a serving base station to a target base station; and
communicating a handover request to the serving base station.

* * * * *